(12) United States Patent
Kovacs et al.

(10) Patent No.: US 12,198,152 B2
(45) Date of Patent: Jan. 14, 2025

(54) ON-PREMISES POSITIONING DETERMINATION AND ANALYTICS SYSTEM

(71) Applicant: Target Brands, Inc., Minneapolis, MN (US)

(72) Inventors: David Kovacs, Minneapolis, MN (US); Vinodhini Chandrasekaran, Minneapolis, MN (US); Gowthami Peri, Minneapolis, MN (US); Varsha Shiva Kumar, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 21 days.

(21) Appl. No.: 17/239,110

(22) Filed: Apr. 23, 2021

(65) Prior Publication Data
US 2022/0343342 A1 Oct. 27, 2022

(51) Int. Cl.
G06Q 30/0201 (2023.01)
G01C 21/20 (2006.01)
G06Q 10/047 (2023.01)
G06Q 30/0601 (2023.01)
H04M 3/42 (2006.01)
H04W 4/029 (2018.01)

(52) U.S. Cl.
CPC ....... *G06Q 30/0201* (2013.01); *G01C 21/206* (2013.01); *G06Q 10/047* (2013.01); *G06Q 30/0639* (2013.01); *H04M 3/42348* (2013.01); *H04W 4/029* (2018.02)

(58) Field of Classification Search
CPC ............. G06Q 30/0201; G06Q 10/047; G06Q 30/0639; G01C 21/206; H04M 3/42348; H04W 4/029

USPC ........................................................ 705/7.29
See application file for complete search history.

(56) References Cited

U.S. PATENT DOCUMENTS

| 1,061,650 | A | 5/1913 | Gunnar |
| 5,287,266 | A | 2/1994 | Malec et al. |
| 7,493,336 | B2 | 2/2009 | Noonan |
| 7,672,876 | B2 | 3/2010 | Bonner et al. |
| 7,734,513 | B2 | 6/2010 | Bonner et al. |

(Continued)

FOREIGN PATENT DOCUMENTS

| CN | 104637198 A | 5/2015 | |
| CN | 104736964 A | * 6/2015 | ............ G01C 21/14 |
| CN | 111182449 A | 5/2020 | |

OTHER PUBLICATIONS

Understanding Customer Experience throughout the customer journey. Lemon et al.; 2016 (Year: 2016).*

*Primary Examiner* — Francis Z. Santiago Merced
(74) *Attorney, Agent, or Firm* — Merchant and Gould, PC

(57) ABSTRACT

The present disclosure provides methods and systems for tracking a shopper route at a retail enterprise. Location information associated with assets can be collected at a retail location, from which a detailed route through the retail location may be recreated and overlaid on map data reflecting a retail location layout. Further analysis may be performed on the route. Additionally, the route may be overlaid on a map, including business context information and point-of-sale transaction information, allowing for various metrics and metric visualizations to be generated that can be further analyzed to achieve various objectives.

18 Claims, 12 Drawing Sheets

(56) References Cited

U.S. PATENT DOCUMENTS

| | | | |
|---|---|---|---|
| 8,140,379 B2* | 3/2012 | Anand | G06Q 30/0241 |
| | | | 705/7.31 |
| 8,207,851 B2 | 6/2012 | Christopher | |
| 8,325,982 B1 | 12/2012 | Moon et al. | |
| 8,606,501 B2 | 12/2013 | Hannah et al. | |
| 8,651,389 B2 | 2/2014 | Shastri et al. | |
| 9,758,185 B2 | 9/2017 | Hannah et al. | |
| 10,072,935 B2 | 9/2018 | Vasgaard et al. | |
| 10,140,820 B1 | 11/2018 | Zalewski et al. | |
| 10,280,054 B2 | 5/2019 | High et al. | |
| 10,394,247 B2 | 8/2019 | Ding et al. | |
| 10,571,278 B2 | 2/2020 | Vasgaard et al. | |
| 2008/0243626 A1 | 10/2008 | Stawar et al. | |
| 2012/0019393 A1 | 1/2012 | Wolinsky et al. | |
| 2015/0073899 A1* | 3/2015 | Carpenter | B62B 3/1424 |
| | | | 705/26.8 |
| 2017/0221130 A1 | 8/2017 | Kraus et al. | |
| 2018/0033028 A1 | 2/2018 | Puthalath et al. | |
| 2018/0162433 A1 | 6/2018 | Jones et al. | |
| 2019/0139057 A1* | 5/2019 | Kwak | G01P 15/003 |
| 2020/0096349 A1 | 3/2020 | Black et al. | |
| 2020/0202593 A1 | 6/2020 | Black et al. | |
| 2020/0270106 A1 | 8/2020 | High et al. | |
| 2020/0314598 A1 | 10/2020 | Lissick et al. | |
| 2020/0324598 A1 | 10/2020 | Wagner | |
| 2021/0342588 A1* | 11/2021 | Davis | G06V 20/10 |

* cited by examiner

| Store | Day | Decorative Home | Domestics | Kitchen | Mini Seasonal | Seasonal | Stationery | Storage/Utility | Electronics | Entertainment | Luggage | Sporting Goods | Toys |
|---|---|---|---|---|---|---|---|---|---|---|---|---|---|
| 111 | 10/1/25 | 56 | 131 | 80 | 81 | 132 | 78 | 98 | 175 | 124 | 43 | 69 | 140 | 517 |
|  | 10/2/25 | 64 | 113 | 87 | 76 | 146 | 104 | 82 | 119 | 137 | 65 | 68 | 146 | 858 |
|  | 10/3/25 | 65 | 137 | 78 | 64 | 175 | 114 | 79 | 143 | 131 | 35 | 62 | 150 | 1082 |
|  | 10/4/25 | 52 | 133 | 86 | 82 | 164 | 101 | 81 | 141 | 166 | 40 | 54 | 175 | 791 |
|  | 10/5/25 | 90 | 113 | 83 | 71 | 138 | 93 | 86 | 161 | 99 | 90 | 48 | 118 | 570 |
|  | 10/6/25 | 55 | 122 | 70 | 92 | 123 | 77 | 67 | 157 | 111 | 24 | 50 | 120 | 523 |
|  | 10/7/25 | 67 | 103 | 70 | 73 | 138 | 94 | 92 | 122 | 149 | 18 | 53 | 162 | 608 |
| 122 | 10/8/25 | 80 | 76 | 109 | 76 | 89 | 182 | 93 | 103 | 83 | 37 | 62 | 130 | 1268 |
|  | 10/9/25 | 83 | 86 | 136 | 64 | 103 | 202 | 81 | 114 | 83 | 23 | 76 | 140 | 1495 |
|  | 10/10/25 | 94 | 82 | 126 | 88 | 104 | 178 | 68 | 101 | 85 | 25 | 58 | 151 | 1864 |
|  | 10/11/25 | 96 | 86 | 136 | 86 | 106 | 165 | 87 | 109 | 44 | 19 | 65 | 137 | 1696 |
|  | 10/12/25 | 80 | 79 | 113 | 60 | 93 | 167 | 71 | 86 | 63 | 36 | 59 | 139 | 1342 |
|  | 10/13/25 | 83 | 74 | 107 | 71 | 87 | 213 | 76 | 132 | 73 | 26 | 62 | 132 | 1116 |
|  | 10/14/25 | 95 | 69 | 123 | 76 | 91 | 222 | 92 | 120 | 97 | 22 | 64 | 137 | 1195 |

FIG. 7

ON-PREMISES POSITIONING DETERMINATION AND ANALYTICS SYSTEM

TECHNICAL FIELD

The present disclosure relates generally to methods and systems for determining a position of an object within a retail location. More particularly, the present disclosure describes a system architecture for linking one or a combination of location information, map information, and transaction information associated with a shopper trip to allow for generating various metrics and metric visualizations that can be further analyzed to achieve various physical objectives.

BACKGROUND

Asset tracking, which may be performed in a variety of industries, can be described as a process of tracking an asset's location and may sometimes referred to as asset management. Asset tracking may be performed for a variety of objectives. Some example objectives may include to gain valuable business insights, to maximize operational efficiency, and/or to avoid asset loss or theft. Asset tracking in a retail operation may include collecting location information associated with a shopping trip at a retail location. Current asset tracking systems that may exist may use location information obtained by sensors and methods that may rely on technologies that are unable to generate fine-grained location coordinate information that can be used for determining a detailed route of travel. For example, a detailed path of travel can enable various metrics and metric visualizations to be generated that can be further analyzed to achieve various retail objectives.

SUMMARY

In summary, the present disclosure relates to methods and systems for providing on-premises positioning determination and analytics by determining a detailed route of travel and generating various metrics and metric visualizations based on the route of travel that can be further analyzed to achieve various retail objectives. Various aspects are described in this disclosure, which include, but are not limited to, the following aspects.

In one aspect, a system for providing on-premises positioning analytics includes: at least one processor; and a memory coupled to the at least one processor, the memory including instructions that when executed by the at least one processor cause the system to: receive, from an endpoint device, a request for metrics associated with a shopping route at a retail location; receive asset telemetry information corresponding to location coordinates of a transmitter device at the retail location; determine the shopping route based on the asset telemetry information; categorize the asset telemetry information into at least one shopping trip; receive map information corresponding to the retail location; receive point-of-sale transaction information corresponding to at least one point-of-sale transaction at the retail location; receive item location information corresponding to items included in the at least one point-of-sale transaction; link a point-of-sale transaction to the shopping trip based on a match of location information of items included in the transaction and locations included the shopping route; analyze the linked information and map information for generating metrics and metrics visualizations based on the linked information; and provide the metrics and metrics visualizations to the endpoint device.

In another aspect, a method for providing on-premises positioning analytics includes: receiving, from an endpoint device, a request for metrics associated with a shopping route at a retail location; receiving asset telemetry information corresponding to location coordinates of a transmitter device at the retail location; determining the shopping route based on the asset telemetry information; categorizing the asset telemetry information into at least one shopping trip; receiving map information corresponding to the retail location; receiving point-of-sale transaction information corresponding to at least one point-of-sale transaction at the retail location; receiving item location information corresponding to items included in the at least one point-of-sale transaction; linking a point-of-sale transaction to the shopping trip based on a match of location information of items included in the transaction and locations included the shopping route; analyzing the linked information and map information for generating metrics and metrics visualizations based on the linked information; and providing the metrics and metrics visualizations to the endpoint device.

In another aspect, a computer readable storage medium including executable instructions which, when executed by a processor, cause the processor to provide on-premises positioning analytics, the instructions comprising: receiving, from an endpoint device, a request for metrics associated with a shopping route at a retail location; receiving asset telemetry information corresponding to location coordinates of a transmitter device at the retail location; determining the shopping route based on the asset telemetry information; categorizing the asset telemetry information into at least one shopping trip; receiving map information corresponding to the retail location; receiving point-of-sale transaction information corresponding to at least one point-of-sale transaction at the retail location; receiving item location information corresponding to items included in the at least one point-of-sale transaction; linking a point-of-sale transaction to the shopping trip based on a match of location information of items included in the transaction and locations included the shopping route; analyzing the linked information and map information for generating metrics and metrics visualizations based on the linked information; and providing the metrics and metrics visualizations to the endpoint device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 7 is an illustration of an example metrics visualization including metrics associated with average shopper dwell time in an example implementation.

DETAILED DESCRIPTION

Figure 1:
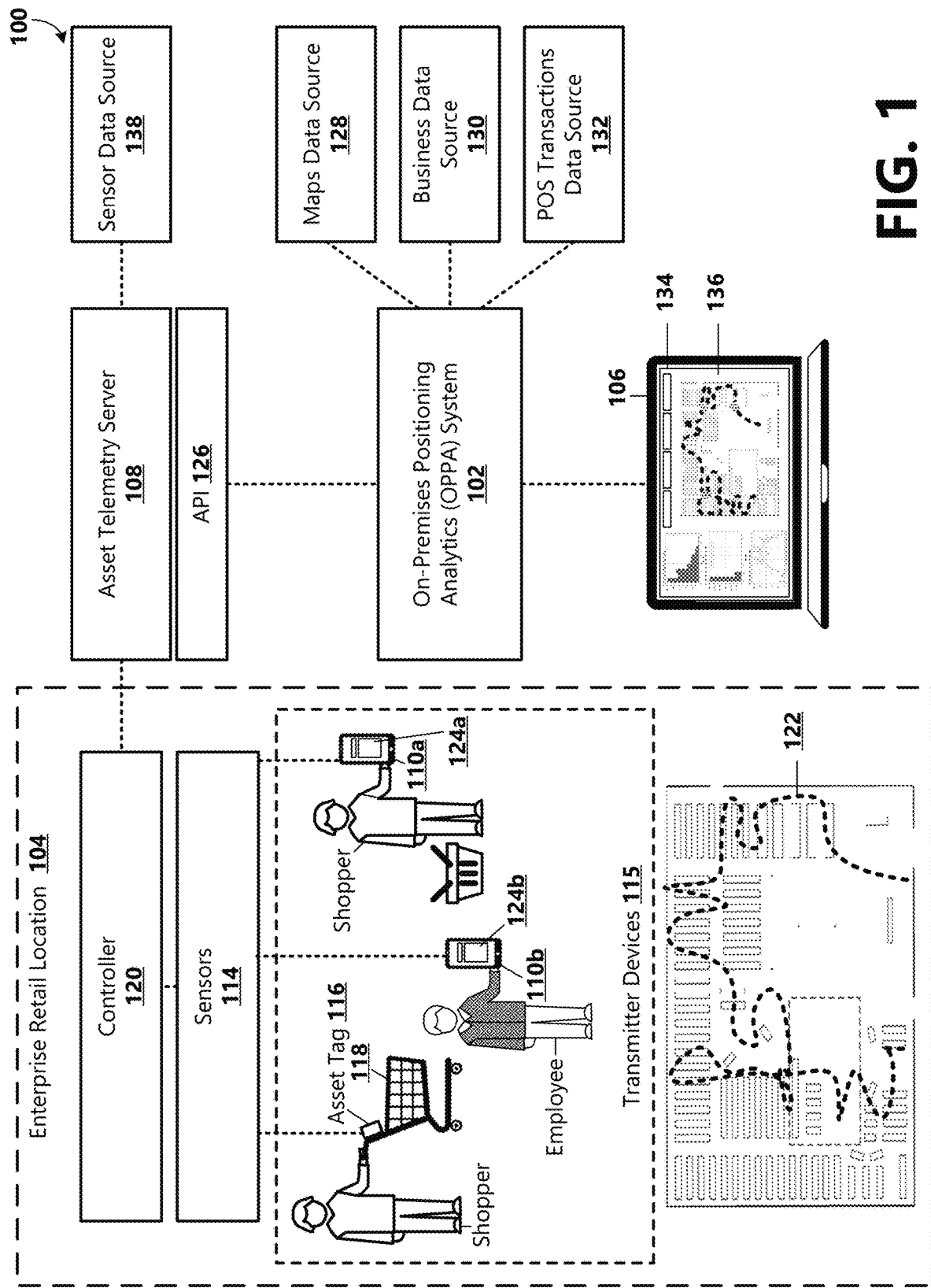
FIG. 1 is a diagram illustrating an example computing network within which an on-premises positioning analytics (OPPA) system may be implemented in an example implementation.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes providing on-premises positioning determination and analytics by determining a detailed set of position points, and optionally a detailed route of travel, and generating various metrics and metric visualizations based on the route of travel that can be further analyzed to achieve various physical objectives at the retail location. These can include adjusting product and object positioning to improve customer flow through a store, reducing high-traffic points to avoid congestion, rearranging promotions or other products to encourage different traffic flows, or other objectives.

FIG. 1 is a diagram illustrating an example networked computing operating environment 100 where a system may be implemented for providing on-premises positioning determination and analytics, herein referred to as an on-premises positioning analytics (OPPA) system 102. In some examples, the OPPA system 102 may be associated with an enterprise, such as a retail enterprise that offers goods and/or services, also referred to herein as items, directly to consumers. According to an aspect, the enterprise may be a retail operation that may include at least one premises or retail location 104, such as a physical store where items are sold. In some examples, the enterprise may further include an online sales channel through which items are sold. Moreover, the enterprise may be further comprised of other enterprise divisions, such as a headquarters and one or more operation centers (e.g., inventory receive centers, flow centers). Although examples are presented primarily regarding the retail industry, these are presented as non-limiting examples, as enterprises in other goods, services, healthcare, educational, professional, and other industries may also make use of the present disclosure.

Aspects of the present disclosure describe technology that can provide positioning determination and analytics by tracking a route that a shopper takes while shopping at a retail location 104 using location data collected at the retail location 104 and overlaying the location with additional data for generating various metrics and metric visualizations. In the depicted example, the OPPA system 102 includes one or more computing devices that communicate with one or more endpoint devices 106 (e.g., over a wireless and/or wired communication network) to provide on-premises shopper positioning metrics and visualizations. The OPPA system 102 may receive data from various data sources, execute software that processes the received data, and provide information based on the processed data to the one or more endpoint devices 106.

In some examples, the OPPA system 102 may be operative or configured to receive asset telemetry from an asset telemetry server 108. The asset telemetry server 108 may be illustrative of an asset tracking computing system that may collect location data associated with a route 122 taken by a shopper while shopping at the retail location 104. According to an example implementation, the asset telemetry server 108 may be configured to collect location data by leveraging a beacon and sensory network and wireless communication technology. The asset telemetry server 108 may be located in a cloud computing network, an edge computing network, or other location.

In some examples, the beacon and sensory network comprises a plurality of beacons 113 and one or more associated sensors 114 distributed throughout a retail location 104. One or more locatable devices 115 may be affixed to a plurality of assets, such as container units (e.g., shopping carts 118 or shopping baskets), moveable fixtures, and/or other assets; or a mobile computing device 110 can operate as a locatable device 115. In some examples, the locatable device 115 is an asset tag. An asset tag 116 may be an electronic device that can be attached to an asset and configured to receive and respond to interrogation wireless signals (sometimes referred to herein as "beacon signals"). For example, an asset tag 116 may use Bluetooth® Low Energy (BLE) technology, wireless ethernet (WIFI) technology, Radio Frequency Identification (RFID) technology, Visual Light Communication (VLC), Long Range (LoRa) technology, or another wireless communication technology to receive interrogation signals (e.g., from one or more beacons 113) and to emit a wireless signal that can carry information that may be read by a sensor 114, for example an RFID reader or other wireless sensing device, which is proximate to the asset tag 116 in the retail location 104.

In other examples, an asset tag 116 may act as a beacon itself, for example by acting directly as a transmitter. In such instances, beacons 113 may not be required to be located at the retail location 104, instead using the locatable devices 115 for transmission of identification signal and sensors 114 able to detect location of those devices.

In some examples, the distance at which beacon signals may be transmitted from the locatable device 115 to one or more sensors 114 may be based on the particular type of asset tag 116 and/or the technology used to transmit the wireless signal.

In some examples, beacon signals may be received and/or transmitted by a mobile computing device 110. For example, the mobile computing device 110 may include a mobile phone, tablet, wearable device, personal digital assistant (PDA), or other mobile computing device that may be carried by a shopper (mobile computing device 110a) or an employee of the retail location 104 (mobile computing device 110b). A location of the mobile computing device 110 may be determined based on various positioning technologies. In some examples, a location of a mobile computing device 110 may be determined based on processing one or a combination of: beacon signals, Global Positioning System (GPS) data, WI-FI data, cellular data, and user-entered data, or via another suitable location process, and can be provided after receiving appropriate permission from a device user. In other examples, the mobile computing device 110 may be operative or configured to execute an application 124 that can be used to instruct the mobile computing device 110 to receive and/or transmit beacon signals, and can relay information that may be read by various sensors 114 positioned throughout the retail location 104. For example, the application 124 may include a web browser application or a client web application. In some examples, the application 124 may be configured to communicate with a web server associated with the enterprise. In some examples, beacon signals may be received and relayed after receiving appropriate permission from the device user. The mobile computing device 110 may be configured to broadcast beacon signals using BLE, WI-FI, RFID, or another wireless communication technology that may be received by the various sensors 114.

The sensors 114 may be positioned at predetermined positions at the retail location 104 and may be configured to detect a locatable device 115 within a range. In some examples, the sensors 114 may listen for beacon signals received from a locatable device 115. For example, an asset tag 116 affixed to a shopping cart 118, a mobile device 110a carried by a shopper, or another type of locatable device 115 may respond to (or directly transmit) periodic beacon signals, with the relayed signal being received by various sensors 114 throughout the retail location 104 as the shopper shops. In some examples, beacon signals may be broadcast at relatively high frequency. In some examples, the sensors 114 (and optionally beacons 113) may be integrated in light fixtures, a ceiling, or on poles within the retail location 104. For example, such sensors 114 may be configured to obtain refined location coordinate information of locatable devices 115. In some implementations, signal strength data corresponding to the locatable device 115 can be collected at each of the sensors 114 and used to estimate a general location of the responsive device 115 in the retail location 104. In some examples and as described in U.S. Provisional Application No. 63/053,214 having the title of "DETERMINING LOCATION OF MOBILE DEVICE" and the filing date of Jul. 17, 2020, which is hereby incorporated by reference in its entirety, the general location can be refined, using particle filter localization techniques and map data corresponding to the retail location 104, for example, and a more precise estimate of the locatable device 115 in the retail location 104 can be determined. In some examples, the refined location data can be stored as either discrete time-location data points that include an identifier of the locatable device 115, or may be gathered into time-series location data along with an identifier of the locatable device 115, and a point in time at which the transmitter was at the estimated location. For example, a dataset of location coordinates can be used to determine a shopper's route 122 through the retail location 104. The dataset may include refined location coordinates collected at a relatively high frequency, and can be used for determining a detailed route 122 of travel. As will be described below, a detailed route 122 of travel can enable various metrics and metric visualizations to be generated that can be further analyzed to achieve various objectives.

In some examples, when a locatable device 115 is detected by a sensor 114, the sensor 114 may be configured to obtain information carried by the beacon signal. For example, the sensor 114 may be configured to obtain a unique device identifier (ID) included in the beacon signal. The sensor 114 may be further configured to transmit the information (e.g., device ID) in a beacon-related communication to an asset telemetry controller 120. For example, the device ID may uniquely identify the locatable device 115 from which the beacon signal was transmitted.

In some examples, the sensor 114 may be further configured to transmit a sensor ID in a beacon-related communication to the asset telemetry controller 120, wherein the sensor ID may uniquely identify the sensor 114 that received the beacon signal transmitted by the locatable device 115.

In some implementations, the sensors 114 may be cameras operative or configured to obtain images within a range. For example, the images may include shoppers within the range such that location information about the shoppers may be obtained for determining a shopping trip and a route 122 of travel. As should be appreciated, in some implementations, location data may be anonymized and aggregated. In some implementations, the OPPA system 102 can optionally include a privacy component that enables the shopper to opt in or opt out of exposing personal information. For example, the privacy component may enable compliance with privacy laws/regulations and an authorized and secure handling of shopper information, such as tracking information, as well as personal information that may have been obtained, is maintained, and/or is accessible. In some examples, the shopper may be provided with notice of the collection of portions of the personal information and an opportunity to opt-in or opt-out of the collection process. Consent can take several forms. Opt-in consent can impose on the shopper to take an affirmative action before the data is collected. Alternatively, opt-out consent can impose on the shopper to take an affirmative action to prevent the collection of data before that data is collected.

According to an aspect, the controller 120 may be operative or configured to receive beacon-related communications from the sensors 114 and serve asset tracking data associated with the beacon-related communications to the asset telemetry server 108. In some examples, the controller 120 may be configured to attach additional information to a beacon-related communication, such as a timestamp of the beacon signal and a retail location ID. In some examples, other asset tracking data and/or additional beacon-related information may be included and provided to the asset telemetry server 108.

According to an aspect, the asset telemetry server 108 may be configured to receive asset tracking data from a plurality of controllers 120 associated with a plurality of retail locations 104. The asset telemetry server 108 may store the asset tracking data received from the controllers 120 in one or more databases, file systems, and/or cached data stores. The asset telemetry server 108 may be further operative or configured to process the asset tracking data for determining various asset telemetry data about the beacon signals as part of providing asset tracking services.

In some examples, the asset telemetry server 108 may be configured to determine location coordinates (e.g., XY coordinates) associated with a location where the asset (e.g., asset tag 116 or mobile device 110) pinged the sensor 114. For example, the asset may be identified by the device ID, and the location coordinates may be based on location coordinates (e.g., X and Y coordinates) of the sensor 114 that received the beacon signal. In some examples, the asset telemetry server 108 may include or be in communication with a sensor data source 138. For example, the sensor data source 138 may store a listing of sensors 114 at a retail location 104, wherein the sensors 114 may be associated with a sensor ID and location coordinates. In some examples, the location coordinates may be further based on signal strength data corresponding to the transmitter device 115. In some examples, the asset telemetry server 108 may be further configured to determine a type of locatable device 115 that transmitted/relayed a beacon signal (e.g., an asset tag 116 or mobile device 110).

In some examples, based on received asset-tracking data, the asset telemetry server 108 may be configured to locate locatable device 115, analyze movement of the transmitter, and generate various asset telemetry information. In some examples, the asset telemetry server 108 may be configured to provide an application programming interface (API 126) that may be used to share asset telemetry information with other computing systems, such as the OPPA system 102.

In some examples, the OPPA system 102 may be configured to call the API 126 exposed by the asset telemetry server 108 to request and obtain a dataset comprising asset telemetry information. In some examples, the OPPA system 102 may request asset telemetry information for a particular retail location 104. In some examples, the asset telemetry dataset may include the unique device ID, a timestamp of the beacon, location coordinates (e.g., X and Y coordinates) locatable device 115 pinged the sensor 114, and a source ID that may identify a type of device (e.g., asset tag 116 or mobile device 110) that transmitted the beacon. In some examples, other asset tracking data and/or additional beacon-related information may be included and provided to the asset telemetry server 108.

In some examples, the OPPA system 102 may be further operative or configured to obtain map information from a map information data source 128, business context information from a business context information data source 130, and point-of-sale (POS) transaction information from a POS transaction information data source 132. The data sources 128, 130, 132, for example, can include one or more databases, file systems, and/or cached data sources.

The map information data source 128, for example, may include a plurality of maps and map information that may plot positions and boundaries of various structures and areas (e.g., zones) within a space. In general, each of the maps may be associated with a different retail location 104; however, in some examples, two or more retail locations 104 may share a similar map. For example, an enterprise may operate a chain of retail stores that may maintain a different (or similar) retail store map for each different location at which the enterprise has a retail store. In some examples, the OPPA system 102 may be configured to retrieve map information from the map information data source 128 for a particular retail location 104.

Figure 2:
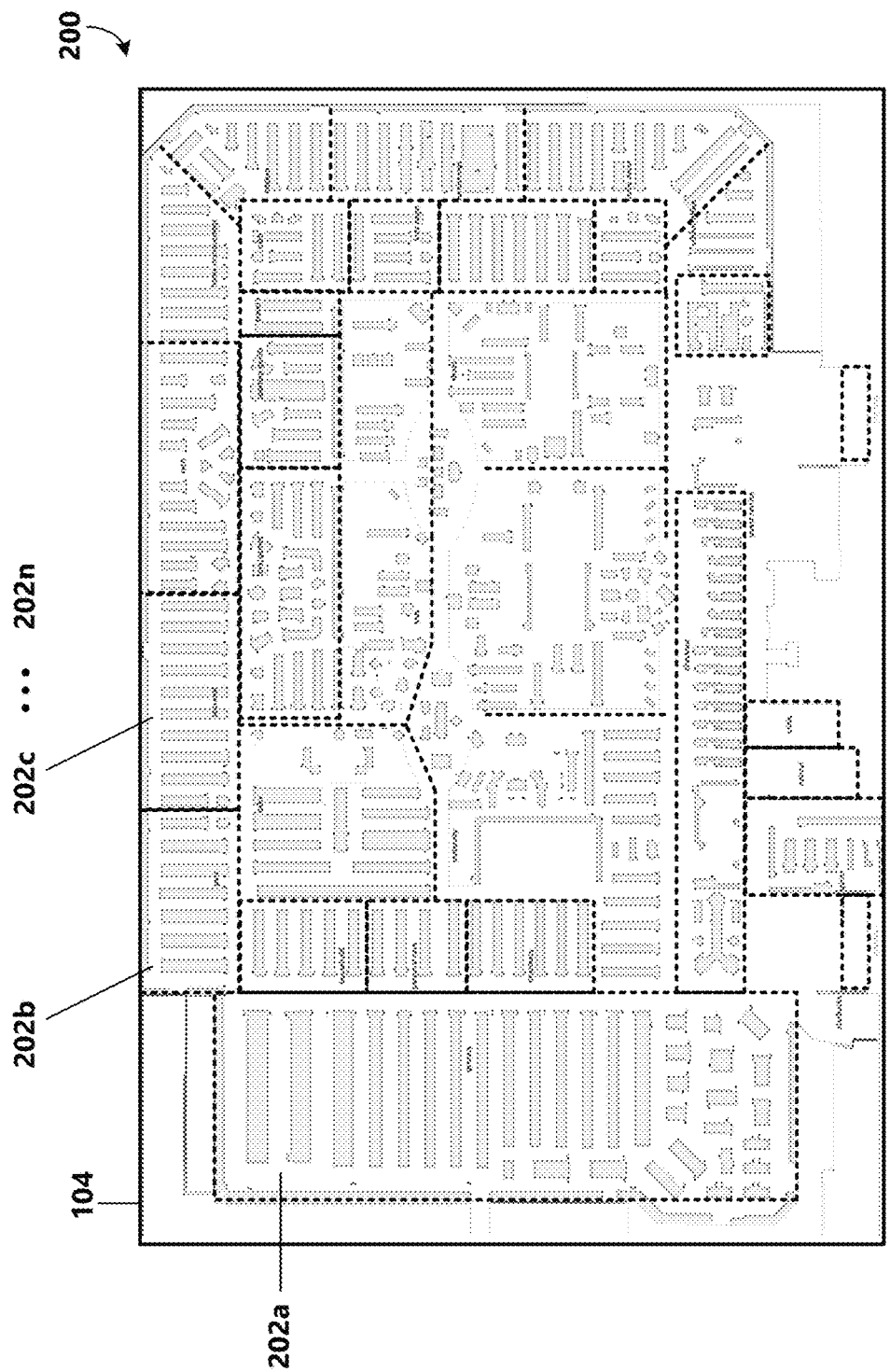
FIG. 2 is a diagram illustrating an example map of a retail location in an example implementation.

Referring now to FIG. 2, an example map 200 of a retail location 104 is shown. In the illustrated example, the map 200 includes various zones 202 and includes various fixed and/or mobile fixtures (e.g., aisles, sections, shelves, racks, bins, and other fixtures) within the zones. In some examples, a zone 202 may include a department (e.g., a grocery department, a home décor department, a children's clothing department), a checkout area (e.g., which may include belted checkout stations and/or self-checkout stations), an entrance, guest services, an order pickup area, etc. In some implementations, a map 200 may be associated with a coordinate system (e.g., an XY coordinate system), and each zone 202 within the mapped space may be plotted on a map based on coordinates corresponding to the locations. For example, the map 200 may be associated with a coordinate system that facilitates rendering of the zones 202, the various aisles, sections, and fixtures within the zones, and indications of one or more asset locations throughout the mapped space.

Referring again to FIG. 1, in some examples, the business context information data source 130 may include adjacency information. For example, adjacency information may include a listing of zones 202 (e.g., areas or departments) in a retail location 104 and the zones 202 that are adjacent to each. A zone 202 may be identified by a name or other identifier, and may include an indication about whether the zone 202 is an adjacency (i.e., adjacent to another zone 202), an indication about a zone 202 type (e.g., an adjacency, an entrance, a checkout zone, guest services, order pickup), and location coordinates of a shape representing the zone 202. In some examples, the OPPA system 102 may be configured to retrieve adjacency information from the business context information data source 130 for a particular retail location 104.

In some examples, the business context information data source 130 may include item location information. For example, item location information may include, for each of a plurality of items (e.g., unique or common items, such as store products, inventory stock, or other items), an item identifier, item location coordinates (e.g., XY coordinates), and item planogram information that indicates assigned locations of the item within a retail location map 200. In some examples, item location information may further include item taxonomy information (e.g., information relevant to a classification of the item within a classification hierarchy). In some implementations, item taxonomy information may include an item classification hierarchy that includes a general classification level, one or more intermediate classification levels under the general classification level, and a discrete classification level for an item. For example, item taxonomy information for a particular item supplied by a particular chain of stores may include a department level, a class level, and an item level. In one example, an item may be a particular type of shirt, and the item taxonomy information for the shirt may indicate that the shirt is classified as being from a kidswear department/zone (e.g., a general item classification level), as a t-shirt within the kidswear department/zone (e.g., an intermediate item classification level), and as an Albert Einstein kid's t-shirt (e.g., a discrete item classification level). In some examples, the OPPA system 102 may be configured to retrieve item location information from the business context information data source 130 for an item at a particular retail location 104.

In some examples, the business context information data source 130 may include promotional item information. For example, promotional item information may include information about items included in one or more item promotion campaigns. An example of an item promotion campaign is a printed or electronic promotion (sometimes referred to as a "circular") of certain items that may be directed to all or a selected group of shoppers. In some examples, an item promotion campaign may be associated with a certain time period. For example, a circular may be distributed by the enterprise on a periodic basis (e.g., daily, weekly, monthly) and the items included in the circular may be promoted for a time period associated with the periodic basis (e.g., for a day, a week, a month). In some examples, the OPPA system 102 may be configured to retrieve a listing of items included in an item promotion campaign from the business context information data source 130 for a particular retail location 104 and for a particular time period.

In some examples, the business context information data source 130 may include out-of-stock item information. For example, item out-of-stock item information may include a listing of items that may have been out-of-stock at a retail location 104 and a time period associated with when the items were out-of-stock. In some examples, the OPPA system 102 may be configured to retrieve a listing of out-of-stock items from the business context information data source 130 for a particular retail location 104 and for a particular time period.

The POS transaction information data source 132, for example, may include POS transaction information that may include information about items purchased at a retail location 104 in associated with a particular POS. For example, the retail location 104 may comprise a plurality of checkout lanes at which a combination of belted and self-checkout POS units may be provided for performing various functions of a retail checkout process. The plurality of checkout POS units may be in communication with a backend system that may be configured to store and provide POS transaction information collected from the plurality of checkout POS units to the OPPA system 102. In some examples, POS transaction information may include, for each of a plurality of POS transactions, one or more transaction IDs, a date of the POS, a start and end time of the POS, and a unique item ID, zone ID, class ID, and description of each item included in the POS transaction. In some examples, a checkout POS unit ID may be included in the POS transaction information. In other examples, a checkout POS unit may be identified based on a transaction ID. In some examples, the OPPA system 102 may be configured to retrieve POS transaction information from the POS transaction information data source 132 for a particular retail location 104 and for a particular time period or date.

As will be described in further detail below, the OPPA system 102 may be operative or configured to perform one or more processes for providing on-premises positioning determination and analytics. In some examples, the OPPA system 102 may be configured to gather and analyze asset telemetry information for determining a shopper trip and overlay asset telemetry information on a map 200 for determining various retail location-level and zone-level metrics. For example, a shopper trip route and/or various asset telemetry information may be overlaid on a map 200 for generating a traffic heatmap that may reveal shoppers' traffic flow patterns around the retail location 104, dwell hot spots associated with points in a shopper trip where the shopper may pause at a particular location, and effects of various store design A/B tests. Non-limiting examples of various metrics that may be determined by the OPPA system 102 may include metrics associated with a number of retail location visits and/or shoppers, trip length, zones 202 visited, dwell hot spots and visits, entrance and exit behaviors, shopper engagement with items and/or displays, and congestion events.

In some examples, the OPPA system 102 may be further operative or configured to link a shopper trip to a POS transaction and overlay POS transaction information on a map 200 for generating additional metrics and metric visualizations. Such metrics and metric visualizations can be further analyzed to determine various shopper engagement behaviors and/or POS conversion effects for achieving various retail objectives.

For example, a location at which a shopper opts to pause for more than, for example, 5 seconds, may be identified as a location of interest to that shopper. This information may be overlaid on a map 200 including information regarding top sales zones, locations of items included in an item promotion campaign, and/or out-of-stock items. Based on this information, a variety of assessments may be performed. In one example, a route 122 that reflects a pause near an out-of-stock item location may represent a lost sale.

With reference still to FIG. 1, in some examples, an endpoint device 106 may execute an application 134 that may be operative or configured to request various metrics and metric visualizations from the OPPA system 102. In some examples, the endpoint device 106 may be configured to display the metrics and metric visualizations on a display screen. For example, the application 134 may include a user interface (UI) 136 with which a user of the endpoint device 106 may interact to request and view a set of metrics and/or metric visualizations. In some implementations, the UI 136 may include one or more controls for indicating a retail location 104, a time period, date, and/or other parameters that may be associated with one or more datasets of information that may be retrieved for generating metrics and metric visualizations.

The OPPA system 102 and other components in the operating environment 100 may be implemented using various types of computing devices that include at least one processor and a memory coupled to the at least one processor, the memory including instructions that when executed by the at least one processor operate to perform one or more operations associated with implementing on-premises positioning determination and analytics. Non-limiting examples of computing devices include servers, workstations, checkout POS units, desktop computers, laptop computers, mobile phones 110, tablets, smart devices, gaming devices, wearable devices, databases, etc. Further details of the computing devices and variations thereof can be found in FIG. 18. In the example operating environment 100, one or more computing systems may communicate over a network or a combination of networks. Non-limiting examples of networks can include the Internet, an intranet, an extranet, a local-area network, a wide-area network, an edge network, wired networks, wireless networks, and combinations thereof.

Figure 3:
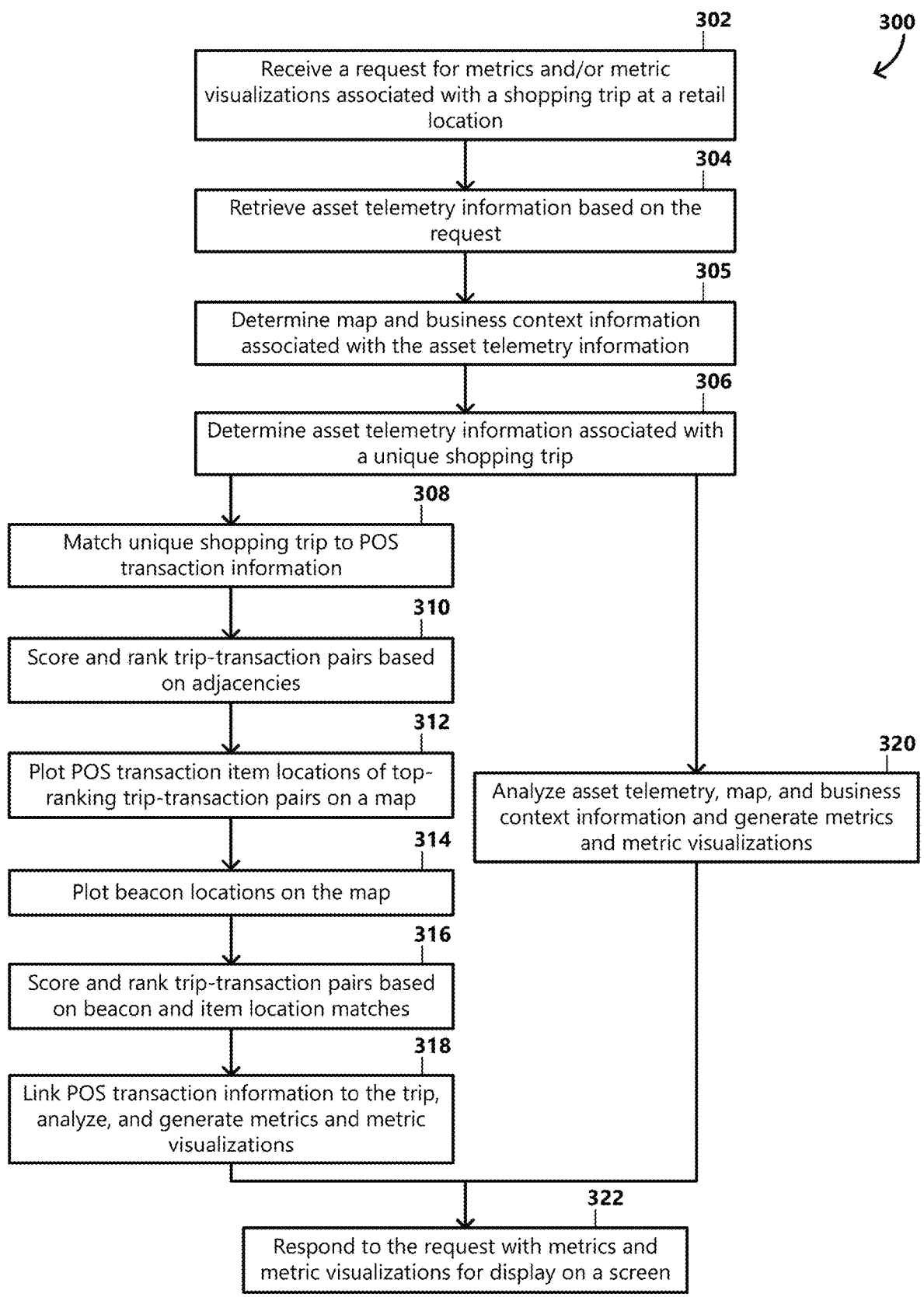
FIG. 3 is a flow chart depicting general stages of an example process or method for providing on-premises positioning analytics in an example implementation.

Further details of processes performed by components of the OPPA system 102 and in the operating environment 100 in accordance with one or more aspects of the present disclosure are described with reference to FIG. 3. In FIG. 3, a flow chart is shown depicting general stages of an example process or method 300 for providing on-premises positioning determination and analytics according to an embodiment. At OPERATION 302, a request for metrics and/or metric visualizations in association with shopping trips at a retail location 104 may be received. In some examples, a user of an endpoint device 106 may employ an application 134 executing on the endpoint device 106 to request the metrics and/or metric visualizations. In some examples, the request may include an indication of one or more parameters that may be utilized to define the datasets of information that the OPPA system 102 may obtain and use for generating the metrics and/or metric visualizations. For example, the one or more parameters may define one or more retail locations 104. The one or more parameters may further define a date and/or time range.

At OPERATION 304, asset telemetry information in association with the request may be retrieved. For example, a request for asset telemetry information associated with the one or more parameters may be communicated to the asset telemetry server 108. In some implementations, the request may be provided to the asset telemetry server 108 using an API 126. In response to receipt of a request for asset telemetry information, for example, the asset telemetry server 108 can provide asset telemetry server 108 to the OPPA system 102 based on the parameters. In some implementations, the response may be provided to the OPPA system 102 using the API 126.

At OPERATION 305, map information, business context information, and/or other datasets of information in association with the request may be obtained or determined. For example, the map information, business context information, and/or other datasets of information may be associated with the one or more parameters and may be utilized by the OPPA system 102 for analyzing the asset telemetry information and/or generating the metrics and/or metric visualizations.

At OPERATION 306, the asset telemetry information may be analyzed, and one or more unique customer shopping trips may be identified based on the asset telemetry information. In some examples, a trip may include a shopper's journey from when the shopper enters a retail location 104 to when the shopper leaves the checkout zone. In an example implementation, a trip may include a trip start that may begin when a shopping cart 118 with an asset tag 116 is detected at an entrance zone 202 of a retail location 104 and a trip end that may end when the cart 118 exits the checkout zone 202, wherein one or more beacon signals may be received in other zones 202 in the retail location 104 between the trip start and the trip end. For example, a shopping trip may be defined based on a set of criteria and the asset telemetry information may be analyzed in view of the set of criteria for determining whether a set of asset telemetry information may be part of a unique shopping trip. In some examples, a trip may be defined based on a minimum time threshold that an asset is detected in a checkout zone 202 and a detection of the asset in the retail location 104 outside of the checkout zone 202 prior to being detected in the checkout zone 202. For example, the trip criteria may be assessed by determining: whether a time interval between consecutive timestamps of beacon signals received from an asset by one or more sensors 114 in the checkout zone 202 meet the minimum time threshold; and whether another beacon signal is received from the same asset in another zone with a timestamp prior to the consecutive timestamps of beacon signals received in the checkout zone 202. In other examples, a trip may be defined based on a minimum time threshold that an asset is detected in a checkout zone 202, as determined by a number of consecutive beacon signals received from an asset in the checkout zone 202, and based on a detection of a beacon signal from the asset in a zone 202 between the checkout zone 202 and an entrance zone 202 and a determination that a distance travelled by the asset through the checkout zone 202 is at least the distance calculated from a first and last point in the checkout zone 202. As should be appreciated, in other examples, other trip criteria may be defined, which may be evaluated for determining whether a set of asset telemetry information may be part of a unique shopping trip.

In some implementations, various operations included in method 300 may be performed in parallel. As an example and as shown in FIG. 3, OPERATIONS 308-318 may be performed concurrently with OPERATION 320. For example, OPERATIONS 308-318 may be directed to linking asset telemetry information to specific POS transactions and for performing subsequent analyses on those POS transactions, and OPERATION 320 may be directed to performing analyses on unique shopping trips that have not been linked to POS transaction information.

At OPERATION 308, asset telemetry information associated with a unique shopping trip may be matched with POS transaction information. For example, upon categorizing a set of asset telemetry information into a unique shopping trip, the trip may be linked to the POS transaction made at the end of the shopping trip. In some examples, a dataset of POS transaction information may be obtained for a date and time period associated with the unique shopping trip. For example, the OPPA system 102 may be configured to request, from the POS transaction information data source 132, POS transaction information for POS transactions with timestamps between a first timestamp and a last timestamp of detected beacon signals in the checkout zone 202 for the unique shopping trip. In response, the OPPA system 102 may be configured to receive a dataset including a listing of candidate POS transactions that may be further evaluated for determining a POS transaction that may be matched with the shopping trip.

At OPERATION 310, the listing of candidate POS transactions may be further evaluated. In some examples, further evaluation of the listing of candidate POS transactions may include analyzing the items purchased in each candidate POS transaction. For example, for each item in a candidate POS transaction, a comparison string may be created. In some examples, the comparison string may include a combination of each item's group, sub-group, division, department/zone, class and sub-class. For example, based on item location and adjacency information for the retail location 104 obtained at OPERATION 305, the OPPA system 102 may determine whether the comparison string matches adjacency information.

In some examples, a trip and a candidate POS transaction (trip-transaction) pair may be scored based on matches between the comparison strings associated with the items purchased in the POS transaction and the adjacency information. For example, a match and a mismatch score for each trip-transaction pair may be determined, wherein the match score may indicate the number of items in the POS transaction that match to an adjacency travelled to, and the mismatch score may indicate the number of items that do not match in the item-adjacency comparison. As an example, if the items included in a POS transaction include: milk, a doll, and a pack of pens, but based on location information associated with detected beacon signals, the shopper has only travelled to a dairy zone and a toys zone, the match score for the trip-transaction pair is 2, and the mismatch score is 1. In some examples, the trip-transaction pairs may be sorted in ascending order, and a top number or percentage of top-scoring trip-transaction pairs may be selected.

At OPERATION 312, for each trip-transaction pair, the locations of the items purchased in the POS transaction may be plotted on a map 200 of the retail location 104, which may be compared against beacon signals received by sensors 114 proximate to the item locations. For example, for each of the top number or percentage of top-scoring trip-transaction pairs from OPERATION 310, the locations of each item may be plotted based on the item's location coordinates, and a pre-determined sized perimeter may be plotted around each item's location.

At OPERATION 314, the locations of the beacon signals associated with a set of asset telemetry information may be plotted on the map 200. For example, the location coordinates (e.g., XY coordinates) associated with locations where the asset (e.g., asset tag 116 or mobile device 110) pinged sensors 114 during the shopping trip may be used to plot the locations of the beacon signals.

At OPERATION 316, an analysis may be performed on the plotted information for determining a number of matches between POS transaction item locations and the beacon locations. For example, an item-beacon match score for each POS transaction may be determined, wherein the item-beacon match score may indicate whether a beacon signal is located inside the perimeter of an item location. For example, a higher match score may indicate a larger number of matches between POS transaction item locations and received beacon signals. The item-beacon match scores may be applied to each trip-transaction pair, and a total score may be determined for each trip-transaction pair. In some examples, based on the total score, a determination may be made as to whether a candidate POS transaction may be linked with a shopping trip. For example, a trip-transaction pair with a top-ranking total score or a total score that meets a pre-determined threshold may be determined as a link, and at OPERATION 318, the POS transaction information may be linked with the asset telemetry information for the trip.

In some examples, additional matching and/or scoring operations may be performed to determine a link between a trip and a POS transaction. One example operation includes a POS unit match. For example, asset telemetry information may be evaluated to identify a location in the checkout zone 202 where a shopper paused for a time period. One or more checkout units located near the location may be identified, and POS transaction information associated with the one or more checkout units may be analyzed for matching against asset telemetry information.

at OPERATION 318, the asset telemetry information associated with one and/or a plurality of shopping trips may be further analyzed. For example, the OPPA system 102 may determine and generate various metrics and metric visualizations based on the linked POS transaction information. As an example, POS transaction information linked with asset telemetry information, maps information, and business context information can be evaluated for determining effects of item promotional campaigns, store layout and redesign configurations, directional signage implementations, congestion events, etc., on POS conversions).

In some examples, OPERATION 320 may be directed to performing various analyses on non-linked asset telemetry information and may be performed in parallel with OPERATIONS 308-318. In some examples, since each reading from a transmitter device 115 includes a timestamp, traffic flow routes 122 and dwell hot spots may be mapped and various store design A/B tests may be performed to achieve various objectives, such as lower congestion, or routing past particular areas of interest.

Figure 4:
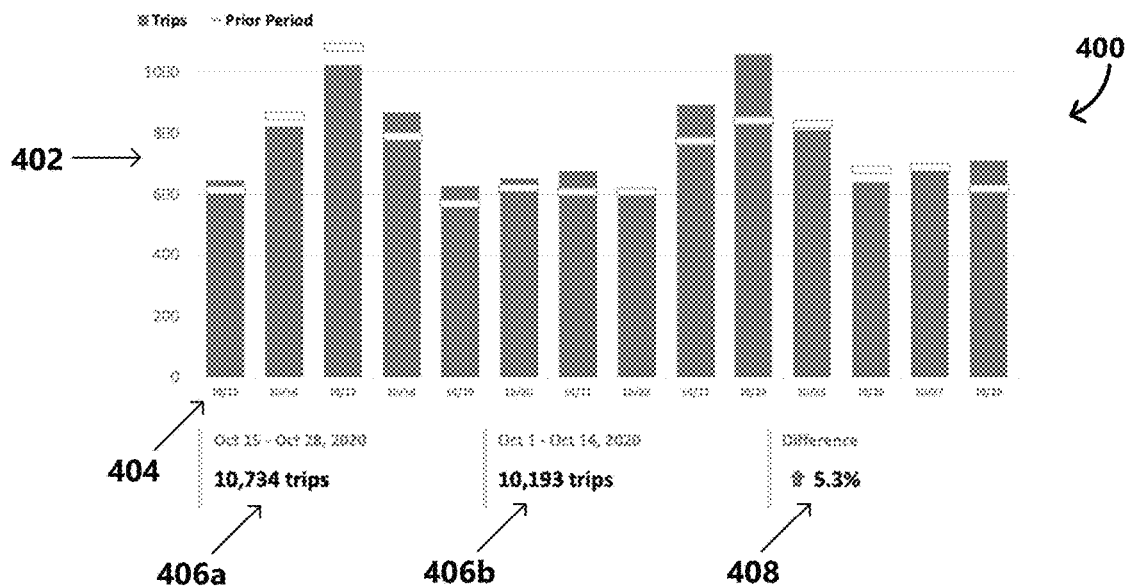
FIG. 4 is an illustration of an example retail location-level metrics visualization that may be generated by the OPPA system in an example implementation.

At OPERATION 322, the OPPA system 102 may provide the metrics and metric visualizations to the endpoint device 106. Some non-limiting examples of various metrics and metric visualizations are illustrated in FIGS. 4-17. In some examples and with reference to FIG. 4, a metric visualization 400 that may be generated by the OPPA system 102 may include retail location-level metrics, such as metrics associated with a number of shopper trips at a retail location 104. As illustrated, a number of identified trips 402 at a retail location 104 may be determined based on collected asset telemetry data and plotted in a graph along a timeline 404. In some examples, the timeline 404 may be based on a request received from an endpoint device 106. In the shown example, the graph shows the number of retail location trips 402 per day for a 30-day time period. The metric visualization 400 may further include a total number 406 of identified trips 402 for a period of time. In the shown example, the graph includes a total number 406a of identified trips 402 in a first time period compared against a total number 406b of identified trips 402 in a second time period. For example, a metric 408 associated with a difference between the total number 406 of trips in the two time periods may be generated and displayed in the graph.

Figure 5:
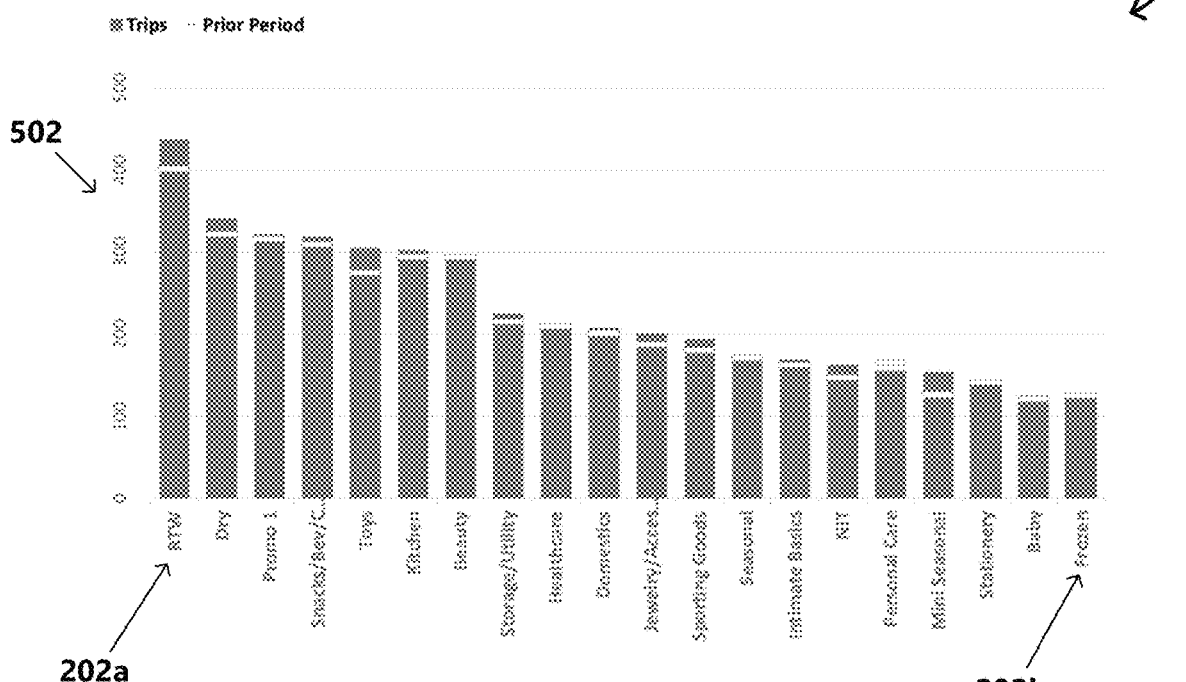
FIG. 5 is an illustration of an example zone-level metrics visualization that may be generated by the OPPA system in an example implementation.

In some examples, and with reference to FIG. 5, an example of zone-level metrics and a metric visualization 500 that may be generated by the OPPA system 102 may include metrics associated with popularity of various zones 202 at the retail location 104. For example, popularity may be determined based on a number of beacon signals received in a zone 202 in a time period. For example, the time period may be based on a request received from an endpoint device 106. In the shown example, the graph shows the number of beacon signal transmissions 502 received in a plurality of zones 202. In some examples, the number of beacon signal transmissions 502 received in the zones 202 in a first time period may be compared against the number of beacon signal transmissions 502 received in the zones 202 in a second time period. For example, in for the time period shown, an RTW (Ready-To-Wear clothing) zone 202a is shown as more popular than a frozen foods zone 202b at the retail location 104. In some examples, the OPPA system 102 may generate metrics associated with popularity of a location within a zone 202. In other examples, the OPPA system 102 may generate metrics associated with popularity of a collection of zones 202. For example, a first collection of zones 202 may represent a front of the retail location 104, a second collection of zones 202 may represent a middle of the retail location 104, and a third collection of zones 202 may represent a back of the retail location 104.

Figure 6:
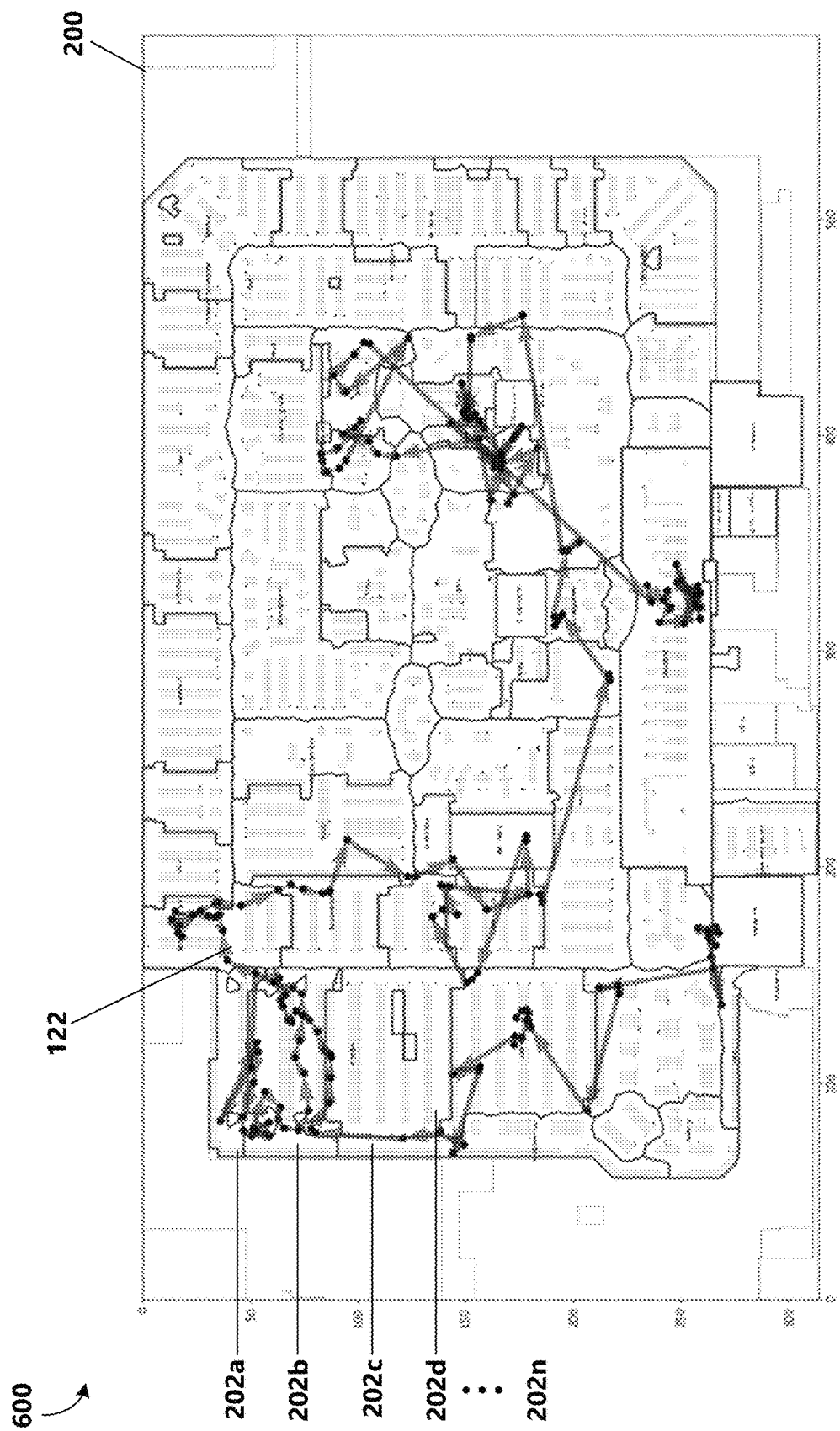
FIG. 6 is an illustration of an example shopping trip route plotted on a map of a retail location in an example implementation.

In some examples, and with reference to FIG. 6, an example metric visualization 600 is shown as a route 122 of a shopping trip plotted on a map 200 of the retail location 104. For example, the plotted route 122 may be a recreated graphical representation of the shopper's route 122 based on locations of received beacon signals throughout the retail location 104 as a shopper shops.

In some examples, times at which a shopper pauses at a particular location in a shopping trip may be identified. The location at which the shopper opts to pause for more than a predefined time period may be identified as a dwell hot spot or as a location of interest to that user. In some examples, and with reference to FIG. 7, an example metric visualization 700 is shown including metrics associated with average shopper dwell time. For example, the metric visualization 700 may include a table in which average shopper dwell times 706 for a plurality of retail locations 104a-e may be categorized by division 702a,b and can be further categorized by zone 202a-f and 202g-k. In some examples, the zones 202 across the retail locations 104a-e may be ranked by average shopper dwell times 706. As shown, a visual indication, such as color, may be used to indicate the ranking of the average shopper dwell times 706 across the retail locations 104a-e. In some examples, the table may further include a total number of trips 704 determined for each retail location 104a-e, wherein the asset telemetry information in association with the trip may be analyzed for determining the dwell times 706.

Figure 8:
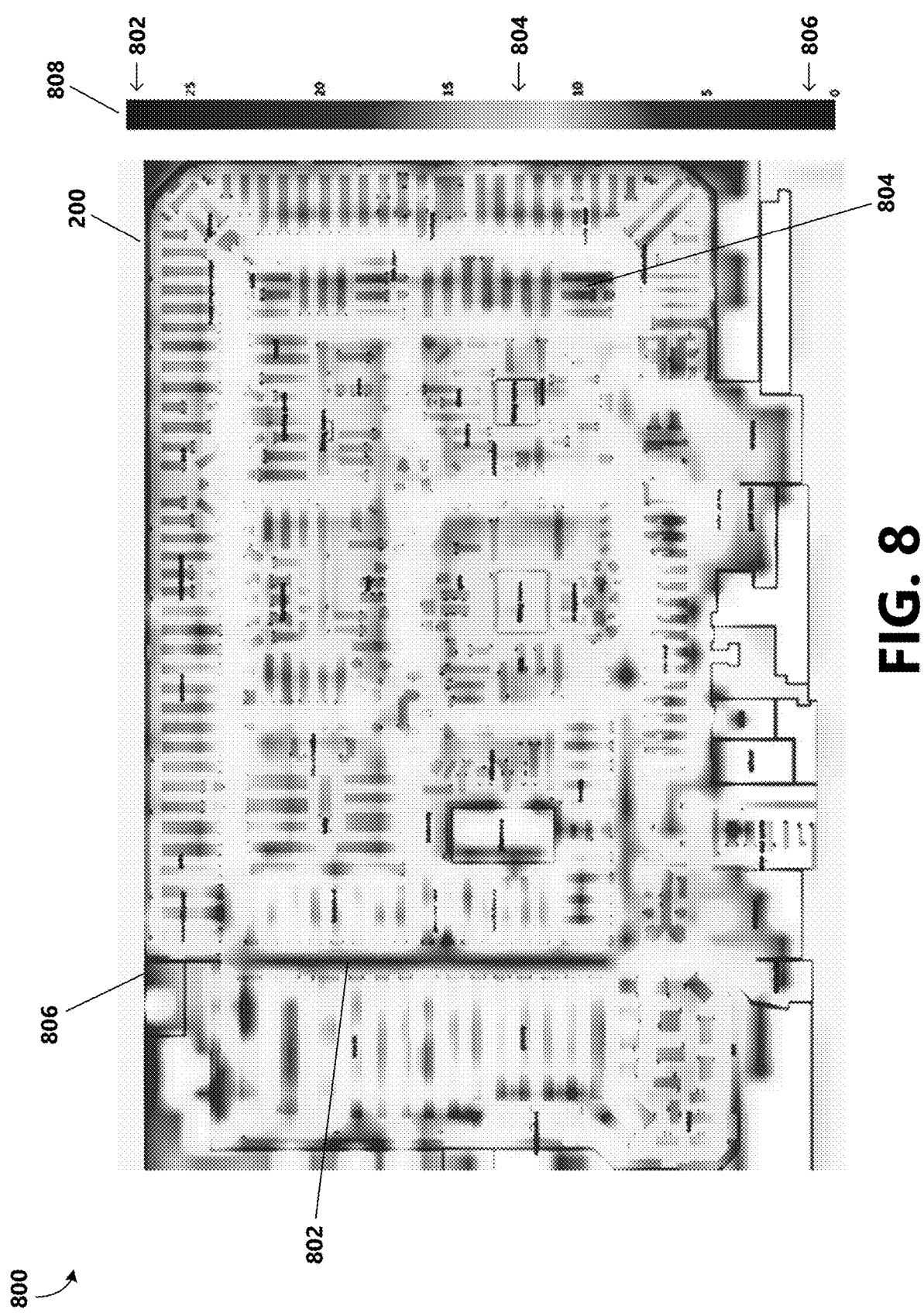
FIG. 8 is an illustration of an example metrics visualization shown as a heat map in an example implementation.

In some examples, and with reference to FIG. 8, an example metric visualization 800 may be shown as a heat map overlaid on a map 200 of the retail location 104. For example, a heat map may be a graphical representation of asset telemetry information, where telemetry values may be depicted by color or shade. In the illustrated example, the telemetry values may be associated with popularity of areas in the retail location 104. For example: a color/shade key 808 is shown indicating that more popular areas (e.g., based on a number of detected beacon signals in the area or based on dwell times in the area) may be represented by a first color/shade 802; less popular areas may be represented by a second color/shade 806; and areas of popularity between the more popular and the less popular areas may be represented by a third color/shade 804. For example, a transition between the color/shades 802,804,806 may include one or more gradients. As shown, the heat map can provide an intuitive visualization of complex data that a user may be enabled to understand at a glance.

Another example analysis may include congestion event tracking. For example, a congestion event may occur when two transmitter devices 115 may ping a sensor 114 within a predetermined distance from each other within a predetermined time period. In one example implementation, the distance may be approximately 2 meters and the predetermined time period may be a 5 second rolling window of time. Congestion events may then be aggregated and determined at particular times of day, or particular days of the week, as well as at specific locations within a retail location 104. In some implementations, congestion events may be tracked for optimizing safety best practices. For example, in times when social distancing may be recommended to prevent transmissions of infectious conditions (e.g., COVID-19, influenza, or other communicable diseases), minimizing contacts between shoppers and congestion events at a retail location 104 may be desirable. Accordingly, using a visualization such as metric visualization 800 allows a user to identify and adjust particular store parameters (e.g., number of checkout lanes open at particular days/times, locations of promotional products, store display layouts, etc.) to reduce any undesirable congestion.

Figure 9:
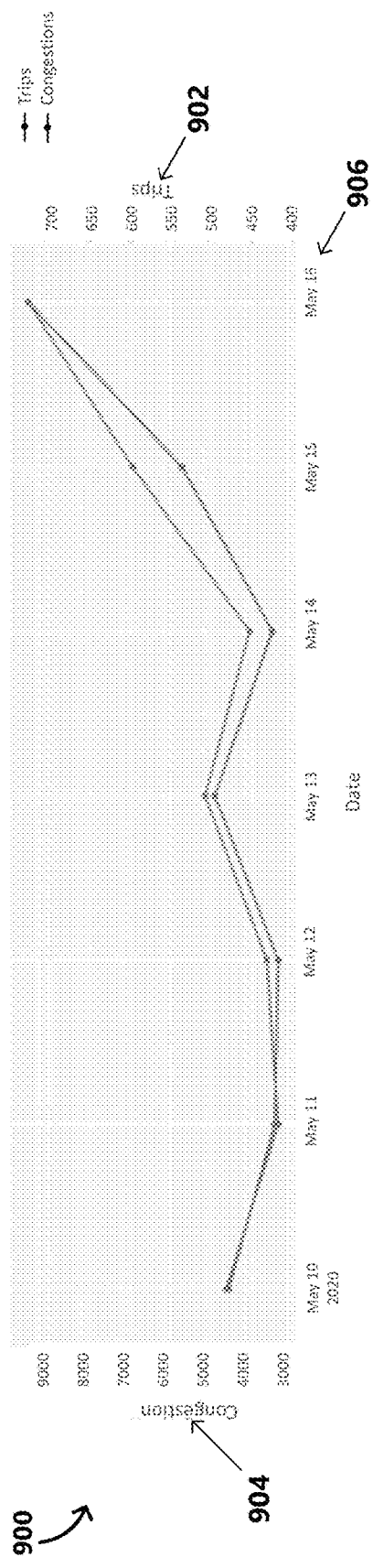
FIG. 9 is an illustration of an example metrics visualization including metrics associated with congestion events in an example implementation.
Figure 10:
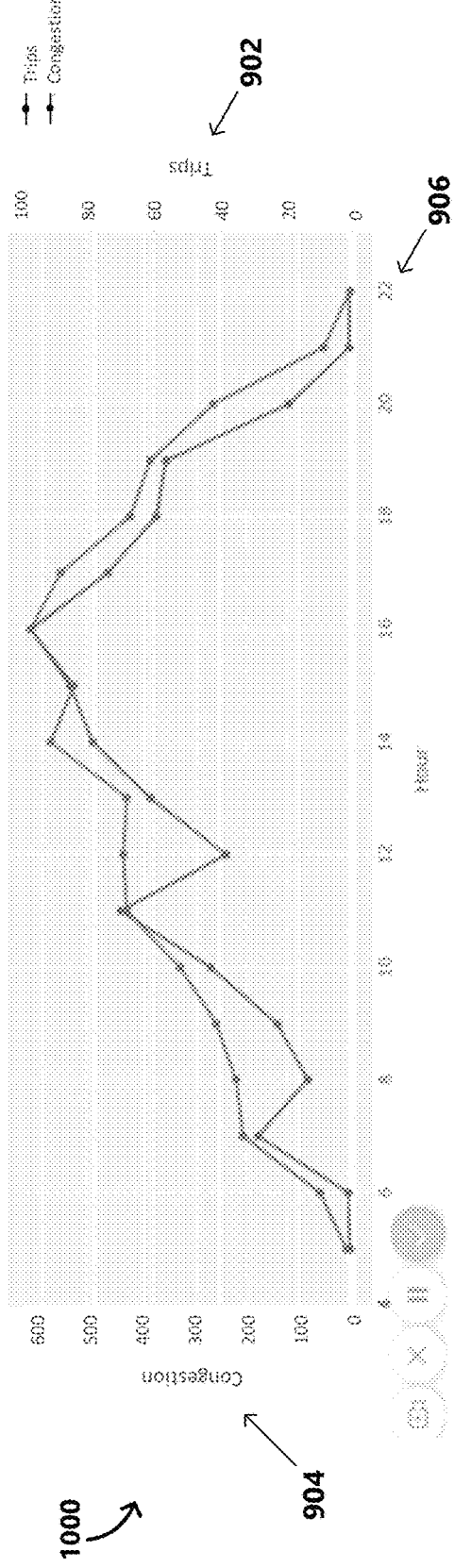
FIG. 10 is an illustration of another example metrics visualization including metrics associated with congestion events in an example implementation.

In some examples and as illustrated in FIGS. 9-12, various congestion event visualizations 900,1000,1100,1200 may be generated. As shown in FIGS. 9 and 10, a number of trips 902,1002 and a number of congestion events 904, 1004 may be determined based on collected asset telemetry data and plotted in a graph along a timeline 906,1006. In some examples, the timeline 906,1006 can be based on a request received from an endpoint device 106. The timeline 906 in FIG. 9 is shown as 1 week, and the timeline in FIG. 10 is shown as 1 day (e.g., 24 hours). For example, the first congestion event visualization 900 shows a correlation between the total number of trips 902 and the number of congestion events 904 based on the day of the week, and the second congestion event visualization 1000 shows a correlation between the total number of trips 1002 and the number of congestion events 904 based on the hour of the day.

Figure 11:
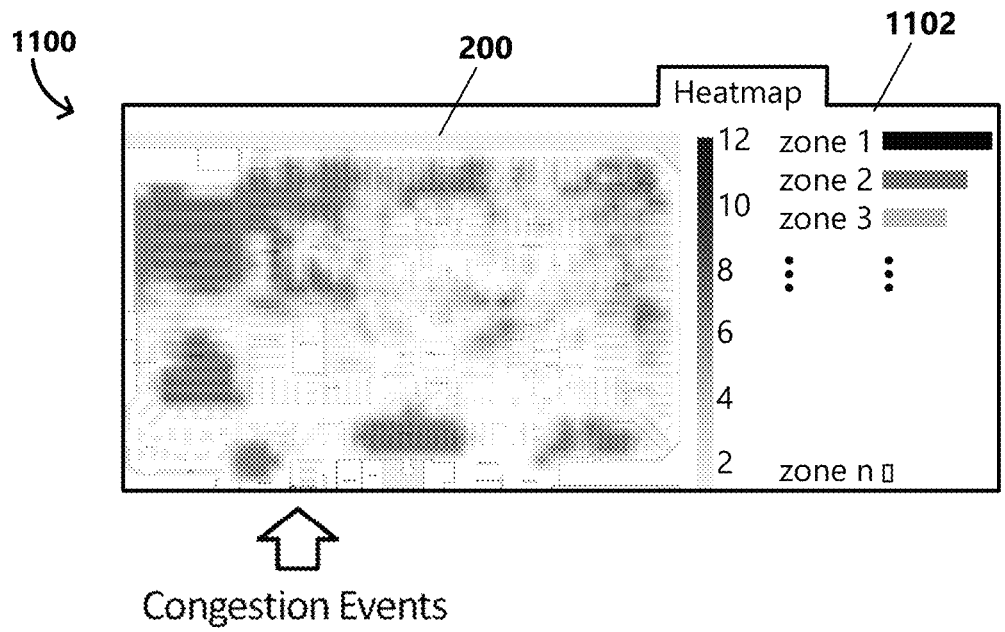
FIG. 11 is an illustration of another example metrics visualization including metrics associated with congestion events in an example implementation.
Figure 12:
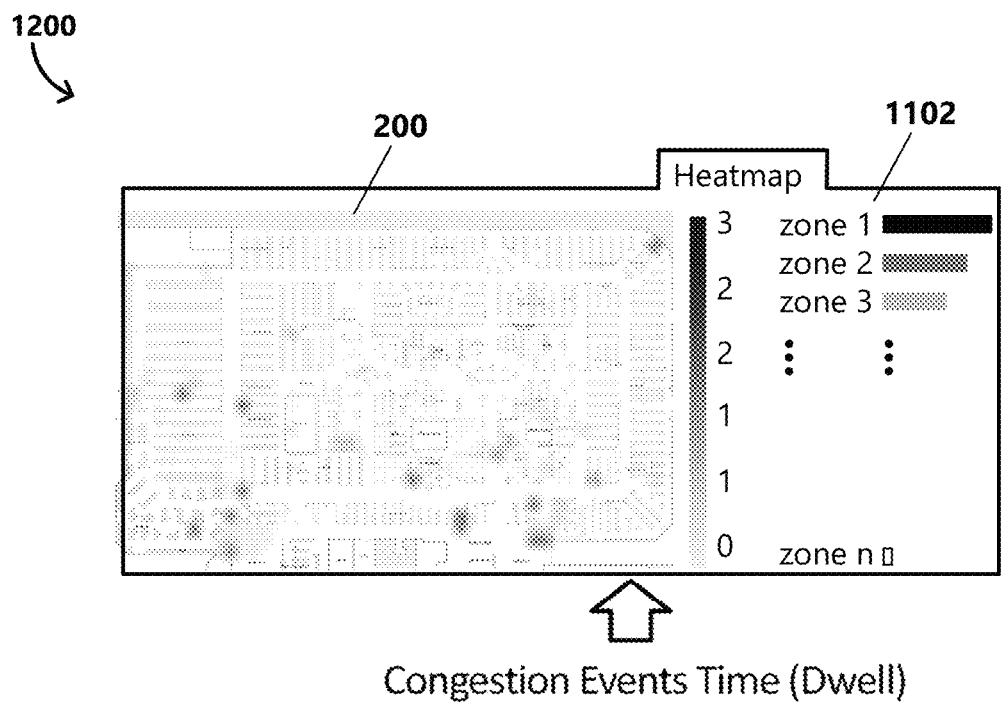
FIG. 12 is an illustration of another example metrics visualization including metrics associated with congestion events in an example implementation.
Figure 13:
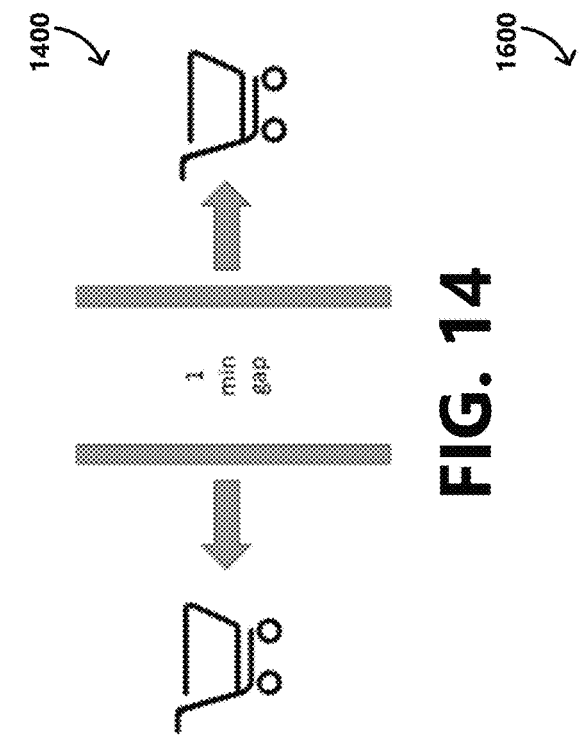
FIG. 13 is an illustration of an example metrics visualization including metrics associated with a distribution of identified shopping trips in an example implementation.
Figure 14:
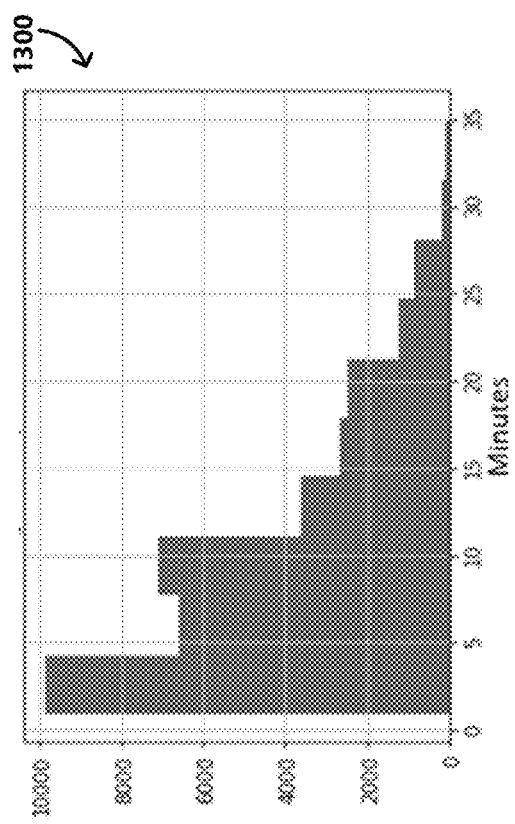
FIG. 14 is an illustration of another example metrics visualization including metrics associated with a distribution of identified shopping trips in an example implementation.
Figure 16:
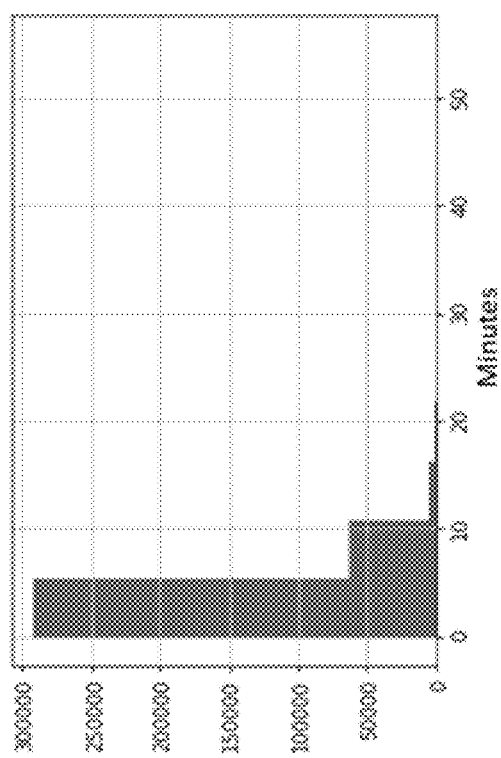
FIG. 16 is an illustration of another example metrics visualization including metrics associated with a distribution of identified shopping trips in an example implementation.
Figure 15:
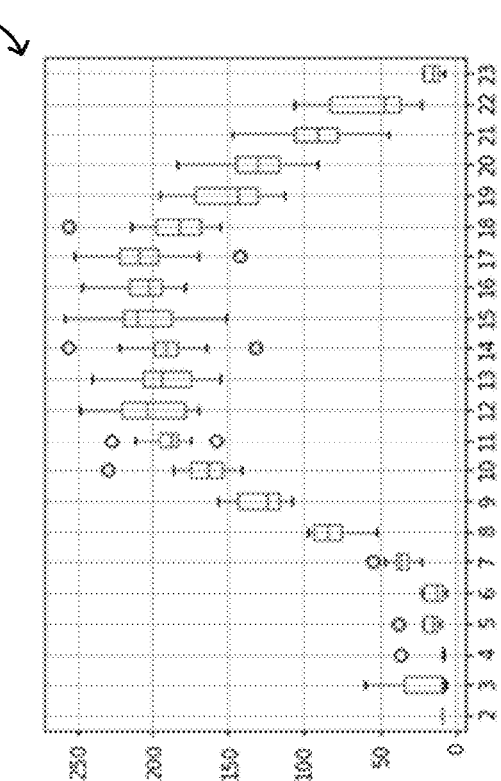
FIG. 15 is an illustration of another example metrics visualization including metrics associated with a distribution of identified shopping trips in an example implementation.

As shown in FIGS. 11 and 12, in some implementations, heat maps may be generated showing congestion events 1104 as well as an elapsed time 1202 the congestion event may occur. Additionally, in some examples, a risk metric 1102 for various zones 202 or other areas in a retail location 104 may be determined (e.g., based on the number of congestion events 904 and/or dwell time/elapsed time 1202 associated with the congestion events) and included in the metric visualization 1100,1200. In some implementations, various comparisons may be made between numbers or percentages of congestion events 904,1004 and trips 9002, 1002.

As shown in FIGS. 13,14,15, and 16, various other example metrics and metric visualizations 1300,1400,1500, 1600 that may be generated by the OPPA system 102 and that may be provided to an endpoint device 106 for display are shown. For example, the example metric visualizations 1300,1400,1500, 1600 may represent a distribution of shopper trips based on collected asset telemetry information. A first example trip distribution metric visualization 1300 shows a distribution of shopper trip durations; a second example trip distribution metric visualization 1400 shows an example average gap (e.g., inter-arrival time) that may be determined between shopper trips; a third example trip distribution metric visualization 1400 shows a distribution of shopper trip starts based on the time of day; and a fourth example trip distribution metric visualization 1500 shows a distribution of POS transaction process times. In some examples, in response to a detection of congestions events 904,1004 and/or other events based on an evaluation of collected asset telemetry information, the enterprise may be enabled to elect to adjust a planogram or adjust routing of shoppers through the retail location 104 (e.g., via adjusting layout configurations and/or via directional signage) to reduce such congestion events 904,1004. This may lead to, for example, proactive checkout lane staffing to avoid queueing.

Figure 17:
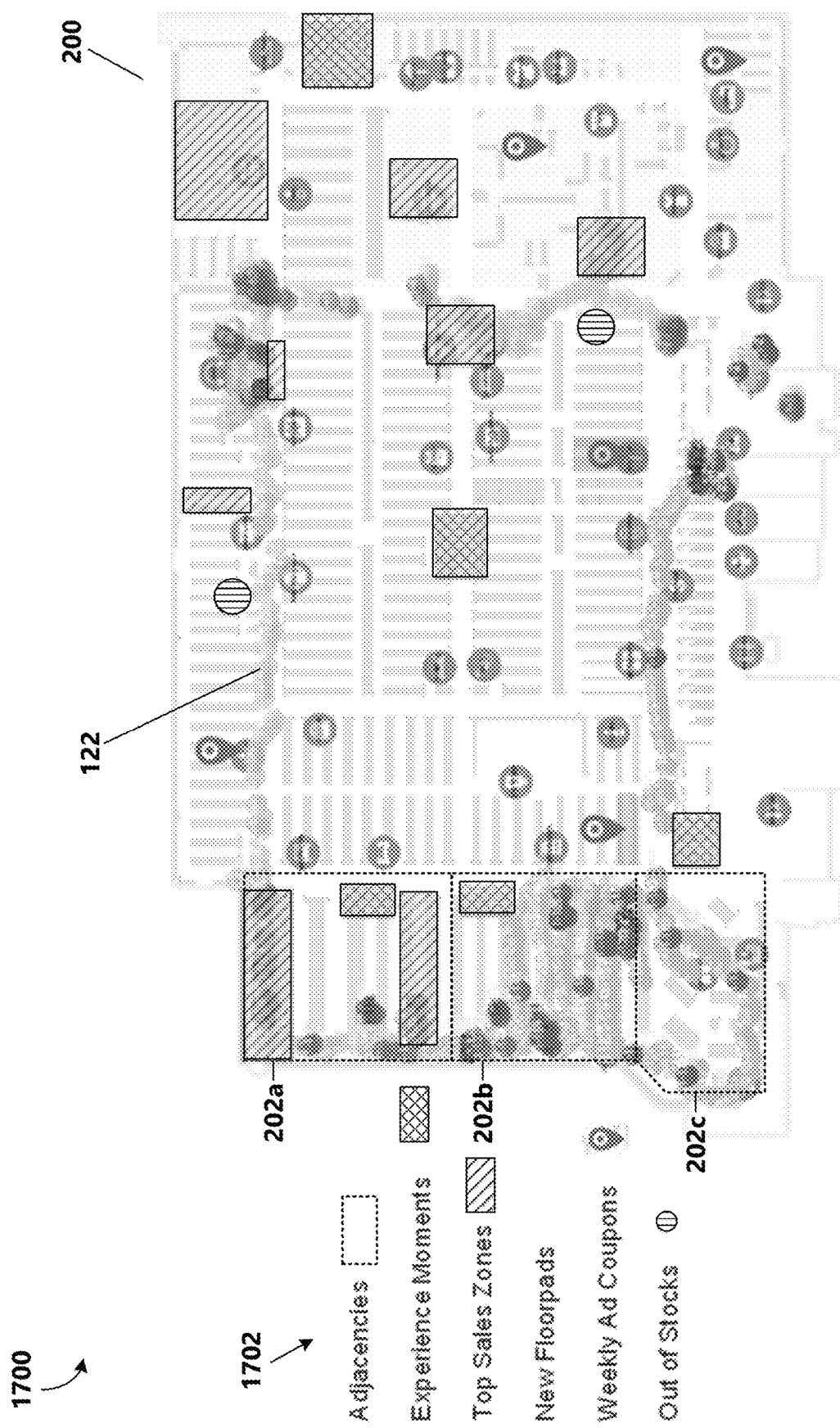
FIG. 17 is an illustration of an example metrics visualization including metrics associated with business context information in an example implementation.

In some examples, and with reference to FIG. 17, location of interest information may be overlaid on the retail location 104 map 200, and additional business context information 1702 may be overlaid for specific analyses. One example analysis may include comparing the locations of interest against item promotion information for determining engagement metrics and/or correlations between paused shopper movements detected in a shopper route 122 and an item promotion campaign. In some examples, item locations associated with items included in the item promotion campaign may be plotted on the map 200 based on the item's location coordinates. Additionally, a pre-determined sized perimeter may be plotted around each item's location. An analysis may be performed on the plotted information for determining a number of matches between promoted item locations and the locations of interest. For example, an item-ad match score for each promoted item may be determined, wherein the item-ad match score may indicate whether a shopper may have dwelled inside the perimeter of a promoted item location.

Another example analysis may include comparing POS transaction information against various map information and business context information for determining various POS conversion metrics. For example, the impacts or effects of traffic, a promotion campaign, item placements, item visibility, store designs, signage, dwell time, etc., on a POS conversion may be determined. As an example, POS transaction information may be compared against item promotion information for determining promotion conversion metrics and/or correlations between an item promotion campaign and purchases of promoted items. For example, a promo-POS match score for each promoted item may be determined, wherein the promo-POS match score may indicate whether a promoted item is included in the POS transaction information. Various visualizations may be generated for graphically representing the POS conversion metrics and/or other shopper engagement correlation information.

Another example analysis may include comparing the locations of interest against out-of-stock item information for determining engagement metrics and/or correlations between paused shopper movements and lost sales. In some examples, item locations associated with out-of-stock items may be plotted on the map 200 based on the item's location coordinates, and a pre-determined sized perimeter may be plotted around each item's location. An analysis may be performed on the plotted information for determining a number of matches between out-of-stock item locations and the locations of interest. For example, an item-OOS match score for each promoted item may be determined, wherein the item-OOS match score may indicate whether a shopper may have dwelled inside the perimeter of an out-of-stock item. As should be appreciated, the above example metrics and metrics visualizations are for illustrative purposes and are not limiting of various other metrics and metrics visualizations that may be generated by the OPPA system 102 for providing on-premises positioning analytics.

Figure 18:
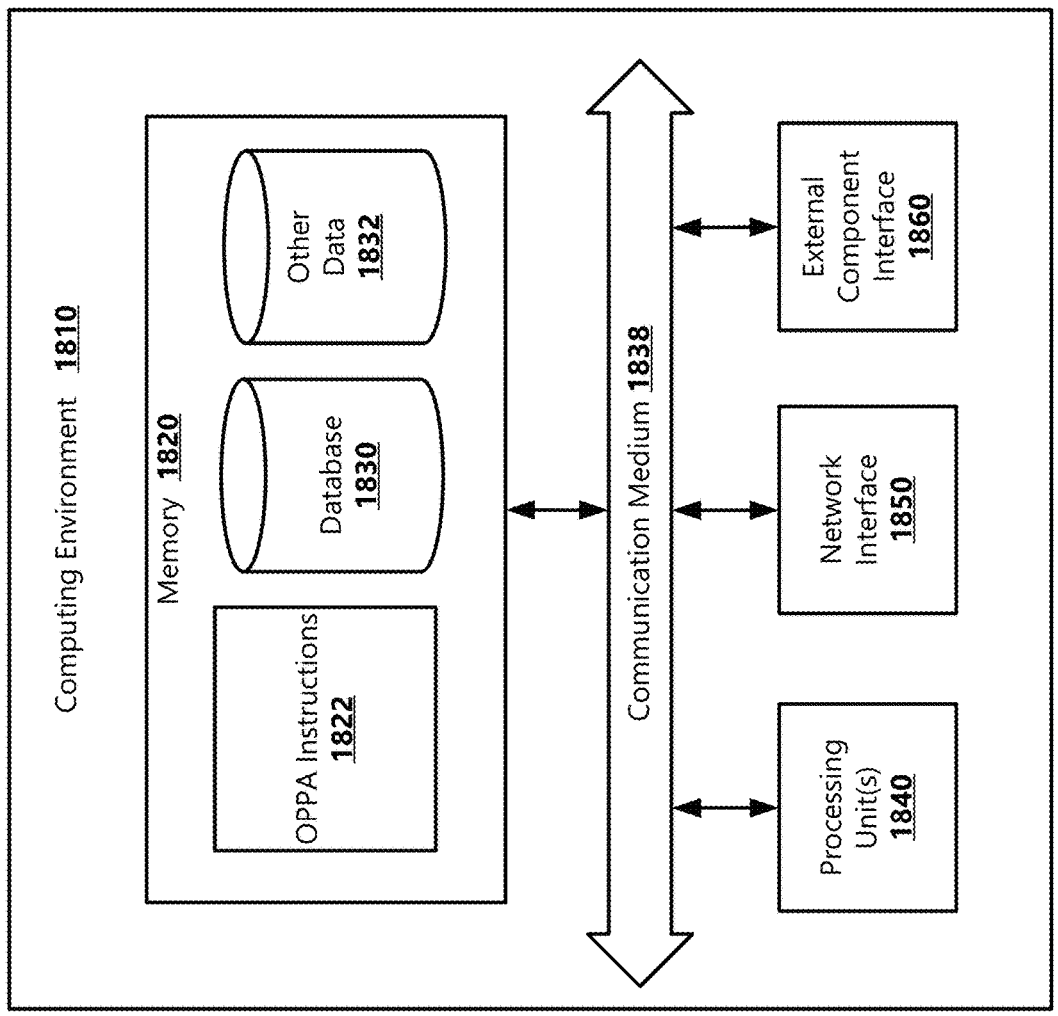
FIG. 18 illustrates an example computing system with which aspects of the present disclosure may be implemented.

FIG. 18 illustrates an example computing system 1800 with which aspects of the present disclosure may be implemented. In an example, one or more components of the OPPA system 102 can be implemented as one or more systems 1800 or one or more systems having one or more components of systems 1800. In an example, the system 1800 can include a computing environment 1810. The computing environment 1810 can be a physical computing environment, a virtualized computing environment, or a combination thereof. The computing environment 1810 can include memory 1820, a communication medium 1838, one or more processing units 1840, a network interface 1850, and an external component interface 1860.

The memory 1820 can include a computer readable storage medium. The computer storage medium can be a device or article of manufacture that stores data and/or computer-executable instructions. The memory 1820 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1820 can store various types of data and software. For example, as illustrated, the memory 1820 includes instructions 1822 for implementing one or more on-premises positioning analytics processes described herein (e.g., as described in relation to FIGS. 1-17), data sources 128,130,132,138, as well as other data. In some examples (e.g., where the computing environment 1810 is the OPPA system 102), the memory 1820 can include instructions for: receiving asset telemetry information and other information associated with a shopping trip at a retail location 104, analyzing the information, and in response to receiving a request on behalf of an endpoint device 106 for metrics information, generating and providing metrics and associated metric visualizations to the endpoint device 106.

The communication medium 1838 can facilitate communication among the components of the computing environment 1810. In an example, the communication medium 1838 can facilitate communication among the memory 1820, the one or more processing units 1840, the network interface 1850, and the external component interface 1860. The communication medium 1838 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communication medium.

The one or more processing units 1840 can include physical or virtual units that selectively execute software instructions. In an example, the one or more processing units 1840 can be physical products comprising one or more integrated circuits. The one or more processing units 1840 can be implemented as one or more processing cores. In another example, one or more processing units 1840 are implemented as one or more separate microprocessors. In yet another example embodiment, the one or more processing units 1840 can include an application-specific integrated circuit (ASIC) that provides specific functionality. In yet another example, the one or more processing units 1840 provide specific functionality by using an ASIC and by executing computer-executable instructions.

The network interface 1850 enables the computing environment 1810 to send and receive data from a communication network. The network interface 1850 can be implemented as an Ethernet interface, a token-ring network interface, a fiber optic network interface, a wireless network interface (e.g., WI-FI), or another type of network interface.

The external component interface 1860 enables the computing environment 1810 to communicate with external devices. For example, the external component interface 1860 can be a USB interface, Thunderbolt interface, a Lightning interface, a serial port interface, a parallel port interface, a PS/2 interface, and/or another type of interface that enables the computing environment 1810 to communicate with external devices. In various embodiments, the external component interface 1860 enables the computing environment 1810 to communicate with various external components, such as external storage devices, input devices, speakers, modems, media player docks, other computing devices, scanners, digital cameras, and fingerprint readers.

Although illustrated as being components of a single computing environment 1810, the components of the computing environment 1810 can be spread across multiple computing environments 1810. For example, one or more of instructions or data stored on the memory 1820 may be stored partially or entirely in a separate computing environment 1810 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

We claim:

1. A system for providing on-premises positioning analytics, comprising:
   at least one processor; and
   a memory coupled to the at least one processor, the memory including instructions that when executed by the at least one processor cause the system to:
      receive, from an endpoint device, a request for metrics associated with a shopping route at a retail location;
      receive, by sensors located throughout the retail location beacon, signals from a locatable device at the retail location;
      receive asset telemetry information corresponding to location coordinates of the locatable device at the retail location, the asset telemetry information including information associated with the beacon signals, including at least one sensor ID uniquely identifying a sensor of the sensors located throughout the retail location that received a corresponding beacon signal of the beacon signals transmitted by the locatable device;
      determine the shopping route based on the asset telemetry information;
      categorize the asset telemetry information into a shopping trip, wherein categorizing the asset telemetry information into the shopping trip is operative to determine a set of asset telemetry information corresponding to the locatable device, the set of asset telemetry information including:
         information associated with beacon signals received from the locatable device in a checkout zone of the retail location;
         information associated with at least one beacon signal received from the locatable device between the checkout zone and an entrance of the retail location after the beacon signals received in the checkout zone; and
         information associated with at least one beacon signal received from the locatable device in another zone in the retail location prior to the beacon signals received in a checkout zone;
      receive map information corresponding to the retail location;
      generate a traffic heatmap that provides one or more locations of interest of the shopping trip, the traffic heatmap including plotted locations of the beacon signals associated with the asset telemetry information overlaid onto the map information;
      receive point-of-sale transaction information corresponding to at least one point-of-sale transaction at the retail location;
      receive item locations corresponding to items included in the at least one point-of-sale transaction;
      plot the item locations with the traffic heatmap;
      determine a match score for a point-of-sale transaction and the shopping trip based on plotted beacon signals of the shopping trip being located inside a perimeter of a plotted location information of items included in the point-of-sale transaction;
      link the point-of-sale transaction to the shopping trip based at least in part on the match score exceeding a predetermined threshold match score;
      analyze the linked information and map information for generating metrics and metrics visualizations based on the linked information; and
      provide the metrics and metrics visualizations to the endpoint device.

2. The system of claim 1, wherein the locatable device is one of an asset tag attached to a shopping container or a mobile computing device configured to transmit beacon signals received by the sensors located throughout the retail location.

3. The system of claim 1, wherein to determine the match score, is operative to:
   generate a comparison string for each item included in the transaction;
   search the comparison strings for a zone;
   search the asset telemetry information corresponding to the shopping trip for the zone; score the transaction based on a number of a matches of the zone between items included in the transaction and in the asset telemetry information; and
   select at least two top-scoring transactions as point-of-sale transaction candidates to link to the shopping trip.

4. The system of claim 3, wherein the system is further configured to:
   determine whether location coordinates of the beacon signals received from the locatable device in the checkout zone correspond with location coordinates of a point-of-sale unit corresponding to the point-of-sale transaction candidate; and
   eliminate a non-corresponding point-of-sale transaction candidate.

5. The system of claim 3, wherein the system is further configured to:
   plot a perimeter around the plotted item locations on the map corresponding to plotted beacon signals;
   score the point-of-sale transaction candidates based on a number of items located in the perimeters; and
   select a top-scoring point-of-sale transaction candidate as the point-of-sale transaction to link to the shopping trip.

6. The system of claim 5, wherein the system is further configured to:
   receive business context information; and
   correlate paused movements in the shopping trip with items based on a correlation between the items and the business context information.

7. The system of claim 6, wherein the business context information includes:
out-of-stock item information; and
promotional item information.

8. The system of claim 1, wherein the metrics and metrics visualizations include congestion event visualizations that identify congestion events and locations of the congestion events at the retail location.

9. The system of claim 1, wherein to link the point-of-sale transaction to the shopping trip is based at least in part on the match score being at least one of:
(a) above a pre-determined threshold;
(b) a top-ranked score; or
(c) any combination of (a) and (b).

10. A method of providing on-premises positioning analytics, comprising:
receiving, from an endpoint device, a request for metrics associated with a shopping route at a retail location;
receiving, by sensors located throughout the retail location beacon, signals from a locatable device at the retail location;
receiving asset telemetry information corresponding to location coordinates of the locatable device at the retail location, the asset telemetry information including information associated with the beacon signals, the information including at least one sensor ID uniquely identifying a sensor of the sensors located throughout the retail location that received a corresponding beacon signal of the beacon signals transmitted by the locatable device;
determining the shopping route based on the asset telemetry information;
categorizing the asset telemetry information into a shopping trip, wherein categorizing the asset telemetry information into the shopping trip comprises determining a set of asset telemetry information corresponding to the locatable device, the set of asset telemetry information including:
information associated with beacon signals received from the locatable device in a checkout zone of the retail location;
information associated with at least one beacon signal received from the locatable device between the checkout zone and an entrance of the retail location after the beacon signals received in the checkout zone; and
information associated with at least one beacon signal received from the locatable device in another zone in the retail location prior to the beacon signals received in a checkout zone;
receiving map information corresponding to the retail location;
generating a traffic heatmap that provides one or more locations of interest of the shopping trip, the traffic heatmap including plotted locations of the beacon signals associated with the asset telemetry information overlaid onto the map information;
receiving point-of-sale transaction information corresponding to at least one point-of-sale transaction at the retail location;
receiving item locations corresponding to items included in the at least one point-of-sale transaction;
plotting the item locations with the traffic heatmap;
determining a match score for a point-of-sale transaction and the shopping trip based on plotted beacon signals of the shopping trip being located inside a perimeter of a plotted location information of items included in the point-of-sale transaction;
linking the point-of-sale transaction to the shopping trip based at least in part on the match score exceeding a predetermined threshold match score;
analyzing the linked information and map information for generating metrics and metrics visualizations based on the linked information; and
providing the metrics and metrics visualizations to the endpoint device.

11. The method of claim 10, wherein determining the match score comprises:
generating a comparison string for each item included in the transaction;
searching the comparison strings for a zone;
searching the asset telemetry information corresponding to the shopping trip for the zone;
scoring the transaction based on a number of a matches of the zone between items included in the transaction and in the asset telemetry information; and
selecting at least two top-scoring transactions as point-of-sale transaction candidates to link to the shopping trip.

12. The method of claim 11, further comprising:
determining whether location coordinates of the beacon signals received from the locatable device in the checkout zone correspond with location coordinates of a point-of-sale unit corresponding to the point-of-sale transaction candidate; and
eliminating a non-corresponding point-of-sale transaction candidate.

13. The method of claim 11, further comprising:
plotting a perimeter around the plotted item locations on the map corresponding to plotted beacon signals;
scoring the point-of-sale transaction candidates based on a number of items located in the perimeters; and
selecting a top-scoring point-of-sale transaction candidate as the point-of-sale transaction to link to the shopping trip.

14. The method of claim 13, further comprising:
receiving business context information; and
correlating paused movements in the shopping trip with items based on a correlation between the items and the business context information.

15. The method of claim 10, wherein generating the metrics and metrics visualizations comprises generating congestion event visualizations that identify congestion events and locations of the congestion events at the retail location.

16. A non-transitory computer readable storage device that includes executable instructions which, when executed by a processor, cause the processor to provide on- premises positioning analytics, the instructions comprising:
receiving, from an endpoint device, a request for metrics associated with a shopping route at a retail location;
receiving, by sensors located throughout the retail location beacon, signals from a locatable device at the retail location;
receiving asset telemetry information corresponding to location coordinates of the locatable device at the retail location, the asset telemetry information including information associated with the beacon signals, the information including at least one sensor ID uniquely identifying a sensor of the sensors located throughout the retail location that received a corresponding beacon signal of the beacon signals transmitted by the locatable device;
determining the shopping route based on the asset telemetry information;

categorizing the asset telemetry information into a shopping trip, wherein categorizing the asset telemetry information into the shopping trip comprises determining a set of asset telemetry information corresponding to the locatable device, the set of asset telemetry information including:

information associated with beacon signals received from the locatable device in a checkout zone of the retail location;

information associated with at least one beacon signal received from the locatable device between the checkout zone and an entrance of the retail location after the beacon signals received in the checkout zone; and information associated with at least one beacon signal received from the locatable device in another zone in the retail location prior to the beacon signals received in a checkout zone;

receiving map information corresponding to the retail location;

generating a traffic heatmap that provides one or more locations of interest of the shopping trip, the traffic heatmap including plotted locations of the beacon signals associated with the asset telemetry information overlaid onto the map information;

receiving point-of-sale transaction information corresponding to at least one point-of-sale transaction at the retail location;

receiving item locations corresponding to items included in the at least one point-of-sale transaction;

plotting the item locations with the traffic heatmap;

determining a match score for a point-of-sale transaction and the shopping trip based on plotted beacon signals of the shopping trip being located inside a perimeter of a plotted location information of items included in the point-of-sale transaction;

linking the point-of-sale transaction to the shopping trip based at least in part on the match score exceeding a predetermined threshold match score;

analyzing the linked information and map information for generating metrics and metrics visualizations based on the linked information; and providing the metrics and metrics visualizations to the endpoint device.

17. The non-transitory computer readable storage device of claim 16, wherein determining the match score and linking the point-of-sale transaction to the shopping trip comprises:

generating a comparison string for each item included in the transaction;

searching the comparison strings for a zone;

searching the asset telemetry information corresponding to the shopping trip for the zone;

scoring the transaction based on a number of a matches of the zone between items included in the transaction and in the asset telemetry information;

selecting at least two top-scoring transactions as point-of-sale transaction candidates to link to the shopping trip;

determining whether location coordinates of the beacon signals received from a transmitter device in the checkout zone correspond with location coordinates of a point-of-sale unit corresponding to the point-of-sale transaction candidate;

eliminating a non-corresponding point-of-sale transaction candidate;

plotting a perimeter around the plotted item locations on the map corresponding to plotted beacon signals;

scoring the point-of-sale transaction candidates based on a number of items located in the perimeters; and selecting a top-scoring point-of-sale transaction candidate as the point-of-sale transaction to link to the shopping trip.

18. The non-transitory computer readable storage device of claim 16, the instructions further comprising:

receiving business context information, the business context information including:
out-of-stock item information; and
promotional item information; and correlating paused movements in the shopping trip with items based on a correlation between the items and the business context information.

* * * * *